United States Patent
Lill et al.

(10) Patent No.: US 10,149,460 B1
(45) Date of Patent: Dec. 11, 2018

(54) PET LOCATION MONITORING AND DETERRENT SYSTEM

(71) Applicant: Jollee, LLC, White Lake, MI (US)

(72) Inventors: Thomas M. Lill, Port Huron, MI (US); Jonathan Robert Robbins, Highland, MI (US); Laura Leavenworth, White Lake, MI (US)

(73) Assignee: Jollee, LLC, White Lake, MI (US)

( * ) Notice: Subject to any disclaimer, the term of this patent is extended or adjusted under 35 U.S.C. 154(b) by 0 days.

(21) Appl. No.: 15/902,740

(22) Filed: Feb. 22, 2018

(51) Int. Cl.
| | |
|---|---|
| *E06B 7/32* | (2006.01) |
| *A45C 13/18* | (2006.01) |
| *A01K 27/00* | (2006.01) |
| *A01M 29/10* | (2011.01) |
| *A01M 29/18* | (2011.01) |
| *A01M 29/24* | (2011.01) |
| *A01M 29/30* | (2011.01) |
| *A01K 29/00* | (2006.01) |
| *A01K 15/02* | (2006.01) |
| *A01M 29/22* | (2011.01) |
| *H04B 17/318* | (2015.01) |

(52) U.S. Cl.
CPC .......... *A01K 27/009* (2013.01); *A01K 15/021* (2013.01); *A01K 15/023* (2013.01); *A01K 15/029* (2013.01); *A01K 27/001* (2013.01); *A01K 29/005* (2013.01); *A01M 29/10* (2013.01); *A01M 29/18* (2013.01); *A01M 29/22* (2013.01); *A01M 29/24* (2013.01); *A01M 29/30* (2013.01); *A45C 13/18* (2013.01); *E06B 7/32* (2013.01); *H04B 17/318* (2015.01)

(58) Field of Classification Search
USPC ..... 119/719, 721, 720, 718, 908; 340/573.1, 340/573.3, 573.4, FOR. 103, 564, 568.1; 256/10
See application file for complete search history.

(56) References Cited

U.S. PATENT DOCUMENTS

| | | | | |
|---|---|---|---|---|
| 5,872,516 | A * | 2/1999 | Bonge, Jr. ............ | A01K 15/023 119/719 |
| 5,917,425 | A * | 6/1999 | Crimmins ................. | G01S 1/70 340/5.81 |
| 6,552,661 | B1 * | 4/2003 | Lastinger ............. | G06K 7/0008 340/572.1 |
| 9,861,076 | B2 * | 1/2018 | Rochelle ............... | A01K 15/023 |
| 2005/0139169 | A1 * | 6/2005 | So ......................... | A01K 15/023 119/721 |

(Continued)

*Primary Examiner* — Andrea M Valenti
(74) *Attorney, Agent, or Firm* — Buckert Patent & Trademark Law Firm PC; John F. Buckert

(57) ABSTRACT

A pet location monitoring and deterrent system is provided. The system includes a first pet collar assembly that transmits a first RF signal. The system includes a first pillar assembly having a first control module, a first RF receiver module, an infrared photodetector array, a first wireless transceiver circuit, and a first warning light. The system includes a second pillar assembly having a second control module, a second RF receiver module, an infrared phototransmitter array, and a second wireless transceiver circuit. The first and second pillar assemblies are disposed a predetermined distance apart from one another such that a warning area is defined in front of and proximate to the first and second pillar assemblies and a keep-out area is defined behind and proximate to the first and second pillar assemblies.

19 Claims, 20 Drawing Sheets

(56) References Cited

U.S. PATENT DOCUMENTS

| | | | |
|---|---|---|---|
| 2005/0166701 A1* | 8/2005 | Mossler | E05B 85/12 74/502.4 |
| 2006/0180094 A1* | 8/2006 | Viggiano | A01K 15/023 119/721 |
| 2006/0252366 A1* | 11/2006 | Eu | A01K 1/0017 455/3.06 |
| 2007/0045018 A1* | 3/2007 | Carter | B60T 7/16 180/167 |
| 2008/0284596 A1* | 11/2008 | Montague | E06B 9/01 340/545.8 |
| 2012/0169500 A1* | 7/2012 | Stern | G08B 13/2402 340/572.1 |
| 2013/0099922 A1* | 4/2013 | Lohbihler | G08B 13/184 340/539.17 |
| 2014/0062728 A1* | 3/2014 | Soto | G01S 7/415 340/937 |
| 2016/0366858 A1* | 12/2016 | Seltzer | A01K 27/009 |
| 2017/0013808 A1* | 1/2017 | Leavenworth | A01K 11/008 |
| 2017/0265432 A1* | 9/2017 | Anderton | G01S 5/02 |

\* cited by examiner

PET LOCATION MONITORING AND DETERRENT SYSTEM

BACKGROUND

The inventors herein have recognized a need for a pet location monitoring and deterrent system that can be easily utilized within a home to keep pets outside of a keep-out area (e.g., a specific room).

SUMMARY

A pet location monitoring and deterrent system in accordance with an exemplary embodiment is provided. The system includes a first pet collar assembly having a first pet collar RF transmitter module that transmits a first RF signal. The system further includes a first pillar assembly having a first control module, a first RF receiver module, a first wireless transceiver circuit, an infrared photodetector array, a first wireless transceiver circuit, and a first warning light. The first control module is operably coupled to the first RF receiver module, the infrared photodetector array, the first wireless transceiver circuit, and the first warning light. The system further includes a second pillar assembly having a second control module, a second RF receiver module, an infrared phototransmitter array, and a second wireless transceiver circuit. The second control module is operably coupled to the second RF receiver module, the infrared phototransmitter array, and the second wireless transceiver circuit. The first pillar assembly and the second pillar assembly is disposed a predetermined distance apart from one another such that a warning area is defined in front of and proximate to the first pillar assembly and the second pillar assembly, and a keep-out area is defined behind of and proximate to the first pillar assembly and the second pillar assembly. The second RF receiver module receives the first RF signal. The second control module determines whether a first RF signal strength of the first RF signal is greater than a threshold RF signal strength. The second control module further determines a first pet collar ID associated with the first pet collar assembly based on the first RF signal. The second control module generates a first control signal to induce the second wireless transceiver circuit to transmit a first wireless message having the first pet collar ID to the first wireless transceiver circuit in the first pillar assembly if the first RF signal strength is greater than the threshold RF signal strength. The first wireless transceiver circuit receives the first wireless message. The first RF receiver module receives the first RF signal. The first control module determines whether a second RF signal strength of the first RF signal is greater than the threshold RF signal strength. The first control module further determines a second pet collar ID associated with the first pet collar assembly based on the first RF signal. The first control module further generates a second control signal to induce the first warning light to emit a first pulsing visible light at a first pulsing frequency, in response to the second RF signal strength being greater than the threshold RF signal strength, and the first pet collar ID being equal to the second pet collar ID.

DETAILED DESCRIPTION

Figure 1:
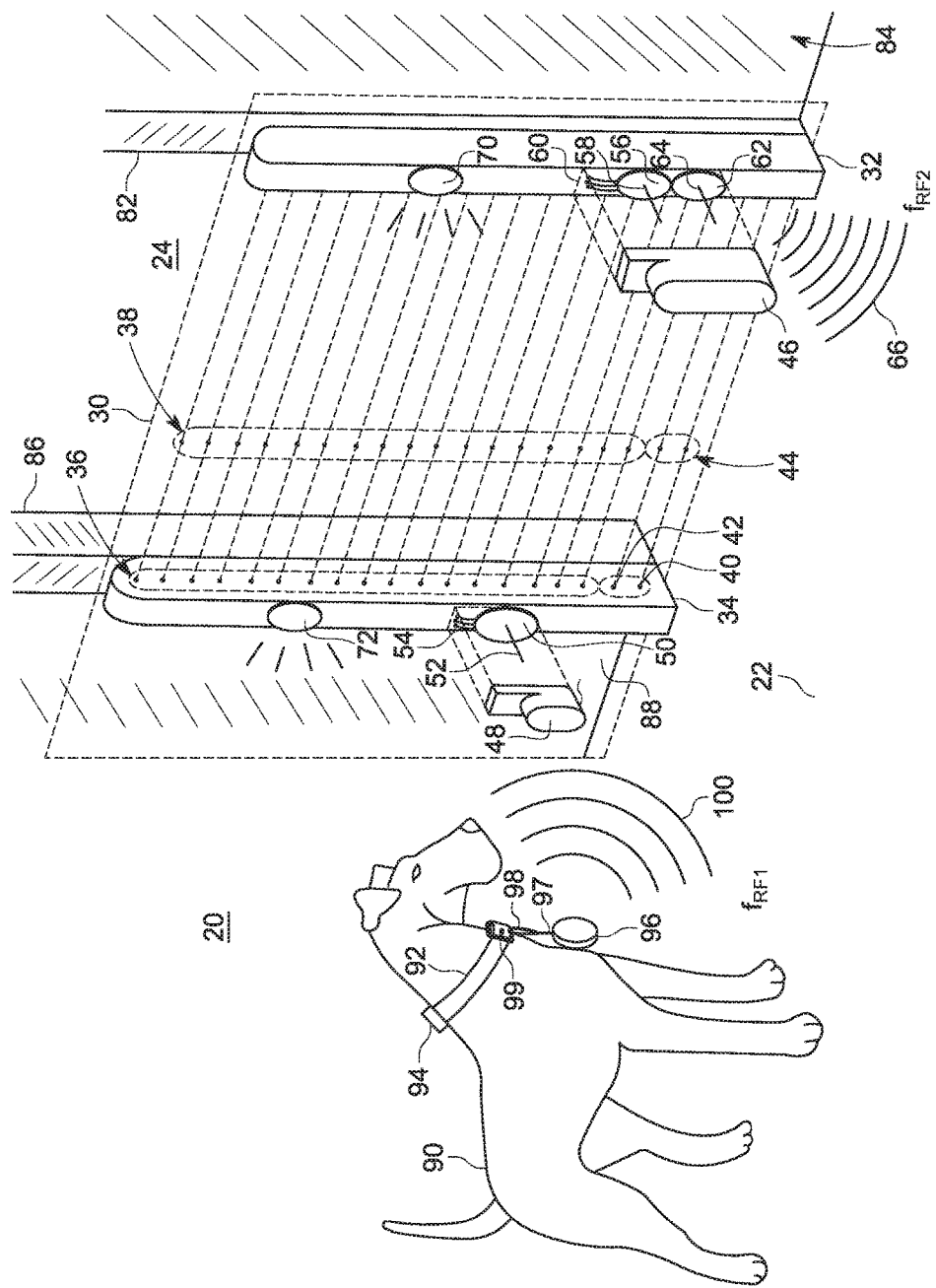
FIG. 1 is a schematic of a pet location monitoring and deterrent system having right and left pillar assemblies in accordance with an exemplary embodiment.

Referring to FIG. 1, a pet location monitoring and deterrent system 20 in accordance with an exemplary embodiment is illustrated. The pet location monitoring and deterrent system 20 monitors the location of a pet 90 and deters the pet 90 from entering a restricted keep-out area 24.

Although the pet 90 is shown as a dog, the pet 90 could be a cat. A plurality of pets is designated as pet A, pet B, pet C, through pet N hereon. The location of the pet 90 is monitored and the pet 90 is deterred from entering the keep-out area 24, if the pet owner so desires and configures the pet location monitoring and deterrent system 20 to do so.

Figure 2:
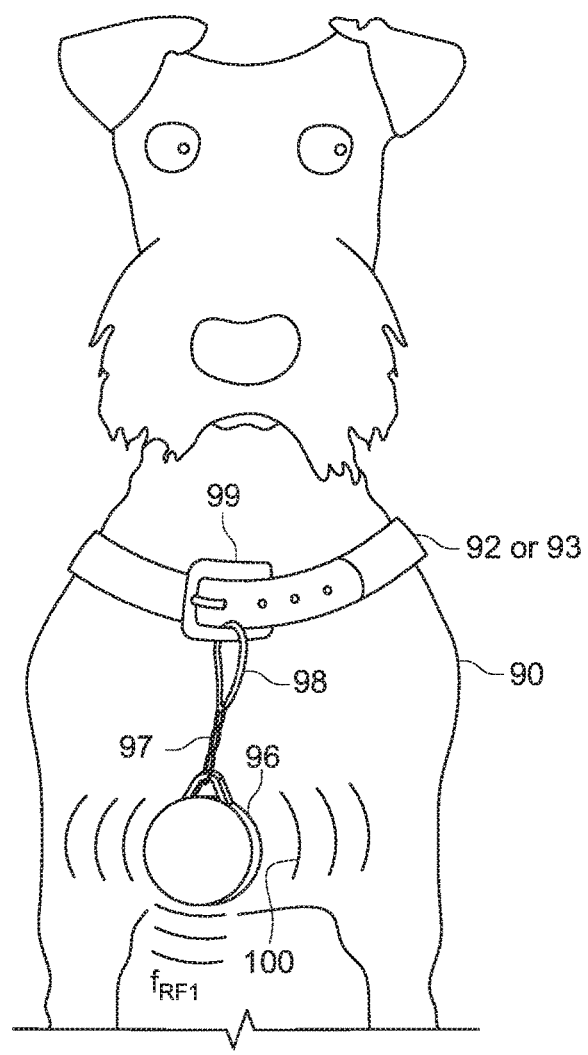
FIG. 2 is a schematic of a first pet identification/location RF transmitting module utilized the system of FIG. 1.

In order to monitor the location of pet 90, a very low power "dog tag" version of pet identification/location RF transmitter module 96 (often referred to herein as "pet RF transmitter module 96"), is hung from a pet collar 92 that is worn around the neck of the pet 90. The pet RF transmitter module 96, as shown in both FIG. 1 and FIG. 2, is contained in a housing that is formed as a circular disk, in the shape of a "dog tag." The "dog tag" is approximately 1.25 inches in diameter and approximately 0.33 inches in thickness. A small chain 97 is used to connect the pet RF transmitter module 96 to a connector hook 98, which attaches the pet RF transmitter module to the buckle 99 of either pet collar 92 or pet collar 93, in another exemplary embodiment. This "dog tag" pet RF transmitter module 96 transmits a very low power RF radio frequency signal at RF radio frequency $f_{RF1}$ which is modulated by an identification audio frequency tone $f_{PETX}$. Each pet has a particular identification audio tone frequency $f_{PETX}$ associated therewith to modulate $f_{RF1}$. The term "audio frequency tone" is utilized only in the sense that it is in the audio frequency range of approximately 50 Hz to 20 kHz. It is not an audible (hearable) tone but simply a tone that modulates the RF carrier frequency $f_{RF1}$ to identify the particular pet wearing the pet RF transmitter module 96. The modulated $f_{RF1}$ radio waves are numbered 100 in FIG. 1 and FIG. 2. Typically, the RF frequency $f_{RF1}$ could be 433.92 MHz, 868 MHz or 915 MHz, or some other UHF band RF frequency. Typically, as previously stated, an identification audio frequency tone $f_{PETX}$ is a tone in the audio frequency range of approximately 50 Hz to 20 kHz. For example, an identification audio tone frequency $f_{PETA}$ that is associated with the pet A may be 4,000 Hz; an identification audio tone frequency $f_{PETB}$ that is associated with the pet B may be 6,000 Hz; and an identification audio tone frequency $f_{PETC}$ that is associated with the pet C may be 9,500 Hz.

In the right pillar assembly 32, the RF receiving antenna 58 (for receiving RF frequency $f_{RF1}$) is horizontal (parallel to the floor 22) and emerges perpendicularly from a ground plane that is vertical to the floor 22. The RF receiving antenna 58 is approximately one quarter wavelength in height. The right pillar assembly 32 also contains RF control code transmitter 400 (shown in FIG. 11) and an RF control transmitter antenna 64 (which is horizontal (parallel to the floor 22) and emerges perpendicularly from a ground plane that is vertical to the floor 22) to transmit deterrent codes at RF frequency $f_{RF2}$ to the pet's RF receiver/deterrent module 94 attached to the pet collar 92. The deterrent codes will determine what pet deterrent method, such as electric shock and/or vibration, and its level of severity, will be selected for use by deterrent module 94 on the pet collar 92 The RF transmitter control code signal sent by RF control code transmitter 400 is numbered 66 in FIG. 1. Please note that pet RF transmitter frequency $f_{RF1}$ and RF control transmitter frequency $f_{RF2}$ are not the same RF frequency, but are completely different. In addition to the RF components described above, the pillar assemblies 32, 34 use an infrared light beam between the pillar assemblies 32, 34 to communicate with one another. Further, the left pillar assembly 34, using an infrared light diode array, sends an array of infrared light beams across the doorway to an infrared photodetector diode array 305 (shown in FIG. 9) in the right pillar assembly 32. When the pet goes through the doorway, the pet blocks these infrared light beams and this is detected by the infrared photodetectors and associated microprocessor 300 on the right assembly 32, to determine that the pet has entered the restricted keep-out area 24.

A brief description of the environment where the pet location monitoring and deterrent system 20 can be utilized will be explained. In particular, the system 20 can be utilized indoor in a house, an apartment, or other dwelling. A floor 20 of an exemplary dwelling is shown. A restricted keep-out area 24 is a room, or a space of the house, the apartment, or other dwelling. The portal 30 is an entrance into the restricted keep-out area 24 in which the pet is not to enter. The portal 30 is shown in FIG. 1 as a dashed line defining a rectangular planar region. The right doorjamb 82 and the left doorjamb 86 of a doorway are illustrated. The right wall 84 of the house or dwelling and is attached to the doorjamb 82. The left wall 88 of the house or dwelling and is attached to doorjamb 86. In an exemplary location, the right pillar assembly 32 and the left pillar assembly 34 are disposed on opposite side of the doorway.

The left pillar assembly 34 includes an infrared light LED transmitting diode array 36 is used to emit a plurality of infrared light beams across the portal 30 of the doorway. The LED transmitting diode array 36 includes 10 to "n" infrared LED transmitting diodes, where the number "n" is optimally selected for a particular pillar assembly height. In FIG. 1, an imaginary dashed line 36 encompasses the LED transmitting diode array 36. As shown, an infrared light beam array 38 is sent from the left pillar assembly 34 to the right pillar assembly 32 across the portal 30 of the doorway. As shown, an imaginary dashed line 38 surrounds the infrared light beam array.

The left pillar assembly 34 further includes an infrared light LED transmitting diode 40 and an infrared light LED receiving diode 42 to implement the infrared bidirectional control communications link 44 (shown by using an imaginary dashed line around the bidirectional infrared beams of the communications link) between the left portal assembly 34 and the right portal assembly 32. Further, on the right pillar assembly 32, the corresponding transmitting infrared diode 41 (not shown) and the corresponding receiving infrared diode 43 are also utilized to implement the bidirectional communication link between the left and right pillar assemblies 34, 32.

The electronics cover 46 of the right pillar assembly 32 and the electronics cover 48 of the left pillar assembly 34 are provided to protect the electronic circuitry therein.

The left pillar assembly 34 further includes the pet RF receiver signal antenna ground plane 50 and the pet RF receiver antenna 52. The pet RF receiver signal antenna ground plane 50 is oriented parallel to a front surface of the left pillar assembly 34 and perpendicular to the antenna 52. The left pillar assembly 34 further includes a PC board 54 and a flashing LED warning light 72.

The right pillar assembly 32 includes the pet RF receiver signal antenna ground plane 56 and the pet RF receiver antenna 58. The pet RF receiver signal antenna ground plane 56 is oriented parallel to a front surface of the right pillar assembly 32 and perpendicular to the antenna 58. The right pillar assembly 32 further includes the electronic circuitry 60 and associated PC board and the RF control transmitter antenna ground plane 64. The RF control transmitter antenna 66 transmits a RF pet control signal to the RF receiver/deterrent module 94 on the back of the pet collar 92 around the neck of the pet 90. The right pillar assembly 32 further includes a flashing LED warning light 70.

As previously described, a pet 90 (either a cat or a dog) and could be either pet A, pet B, pet C, or . . . pet N. The pet collar 92 is placed around the neck of the pet. The RF receiver/deterrent module 94 is attached to pet collar 92. The RF receiver/deterrent module contains an RF receiver, an electric shock warning deterrent device, a vibration warning deterrent device, or some other warning deterrent device or devices. The small chain 97 is used to connect the RF transmitting module 96 to the hook connector 98 that attaches the RF transmitting module 96 to the buckle 99 of the pet collar 92. The RF signal 100 is transmitted by pet identification/location RF transmitting module 96. The RF signal 100 contains the encoded pet tone for the particular pet 90. The RF signal 100 is received by the receiver antennas 52 and 58 on the left and right pillar assemblies 34, 32. The RF receiver/deterrent module 94 is attached to pet collar 92. The RF receiver/deterrent module 94 includes an RF receiver, an electric shock warning deterrent device, a vibration warning deterrent device, or some other warning deterrent device or devices.

Most dogs range from 21 inches to 41 inches high at the shoulder. The right and left pillar assemblies 32, 34 shown in FIG. 1 are approximately 35 inches in height. This height should accommodate almost 100% of all domestic dogs, and certainly 100% of all domestic cats, found in the world, and work well with the pet location monitoring and deterrent system 20 shown in FIG. 1. However, if the height of the right and left pillar assemblies 32, 34 in FIG. 1 is shortened to approximately 24 inches, it is estimated that between 50% and 75% of all domestic dogs, and almost 100% of all domestic cats, could be accommodated by these shorter 24 inch right and left pillar assemblies 32, 34.

Referring to FIG. 2, the "dog tag" version of the pet identification/location RF transmitter module 96 attached to the buckle 99 that is either part of the pet collar 92 or the pet collar 93 hung around the neck of the pet 90, depending upon which exemplary embodiment is utilized. The pet 90 is either a cat or a dog and can be identified as pet A, pet B, pet C, or . . . pet N. It is the pet to be monitored and deterred from entering keep-out area 24. In this exemplary embodiment, the pet identification/location RF transmitter module 96, as shown in both FIG. 1 and FIG. 2, is contained in a housing that is formed as a circular disk, in the shape of a "dog tag." The "dog tag" is approximately 1.25 inches in diameter and approximately 0.33 inches in thickness. A small chain 97 is used to connect the pet RF transmitter module 96 to connector hook 98, which attaches the RF transmitter module to buckle 99 of either pet collar 92 or pet collar 93. This "dog tag" pet RF transmitter module 96 transmits a very low power RF radio frequency signal at RF radio frequency $f_{RF1}$ which is modulated by an identification audio frequency tone $f_{PETX}$. Each pet has a particular identification audio tone frequency $f_{PETX}$ associated with the pet to modulate $f_{RF1}$. Here, the term "audio frequency tone" is utilized only in the sense that it is in the audio frequency range of approximately 50 Hz to 20 kHz. It is not an audible (hearable) tone but simply a tone that modulates the RF carrier frequency $f_{RF1}$ to identify the particular pet wearing the pet RF transmitter module. The modulated $f_{RF1}$ radio waves are numbered 100 in FIG. 1 and FIG. 2. Typically, RF frequency $f_{RF1}$ may be 433.92 MHz, 868 MHz or 915 MHz, or some other UHF band RF frequency. Typically, as previously stated, identification audio frequency tone $f_{PETX}$ will be a tone in the audio frequency range of approximately 50 Hz to 20 kHz. For example, an identification audio tone frequency $f_{PETA}$ that is associated with the pet A may be 4,000 Hz; an identification audio tone frequency $f_{PETB}$ that is associated with the pet B may be 6,000 Hz; and an identification audio tone frequency $f_{PETC}$ that is associated with the pet C may be 9,500 Hz.

The choice of using pet collar 92 or pet collar 93 depends upon which exemplary embodiment is being implemented. The first exemplary embodiment uses a special electric shock and vibration collar 92. On the back of this collar is a module which: (1) has methods to provide vibration and electric shock to the back of the pet wearing the collar (so as to modify the behavior of the pet), and (2) contains an RF radio receiver to receive RF radio control signals to control the vibration and electric shock described in (1). A second exemplary embodiment uses warning/deterrent signals that emanate from the right and left pillar assemblies 32, 34 only. This embodiment does not use an electric shock and vibration collar.

Figure 3:
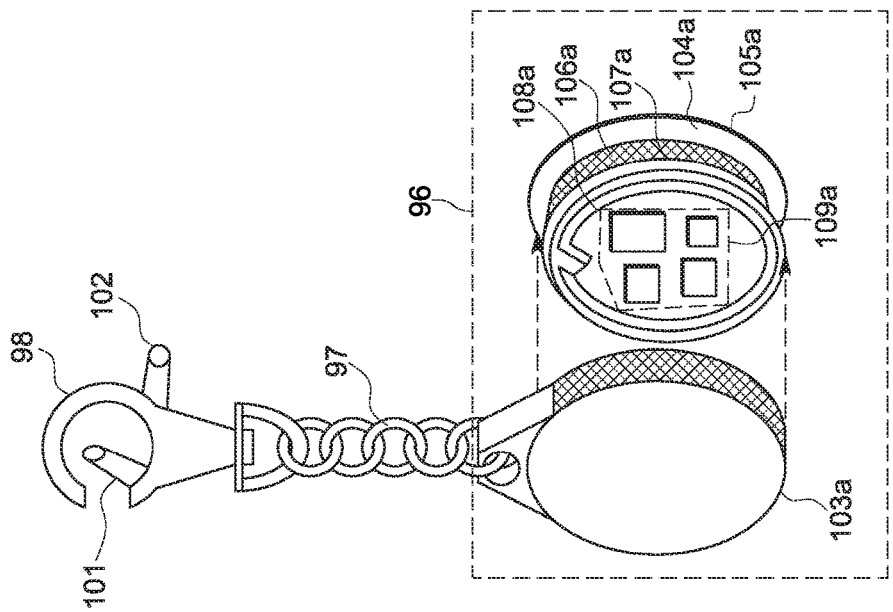
FIG. 3 is an exploded schematic of the first pet identification/location RF transmitting module of FIG. 2.

Referring to FIG. 3, the pet identification/location RF transmitter module 96 in the form of a "dog tag" that is attached to the buckle of a pet collar is illustrated. The "dog tag" version of pet identification/location RF transmitter module 96 consists of a top cover 103a and a bottom cover 104a, which snap together in use. The bottom cover 104a contains component parts as enumerated in the following description. The o-ring 105 keeps out moisture and contaminants from the inside of the module, when the top and bottom covers are snapped together. There is a coin battery 106a, which supplies power to the module, and a printed circuit board 107a, which contains the module's electronic circuitry and electronic components 109a, as well as the module's RF transmitting antenna 108a. One end of connecting chain 97 is attached to top cover 103a of RF transmitter module 96 and the other end is attached to connecting hook 98. The connecting hook 98 also has a movable locking jaw 101 and a trigger 102 to control the opening and closing of locking jaw 101, so as to securely attach the RF transmitter module 96 to buckle 99 of the pet collar.

Figure 4:
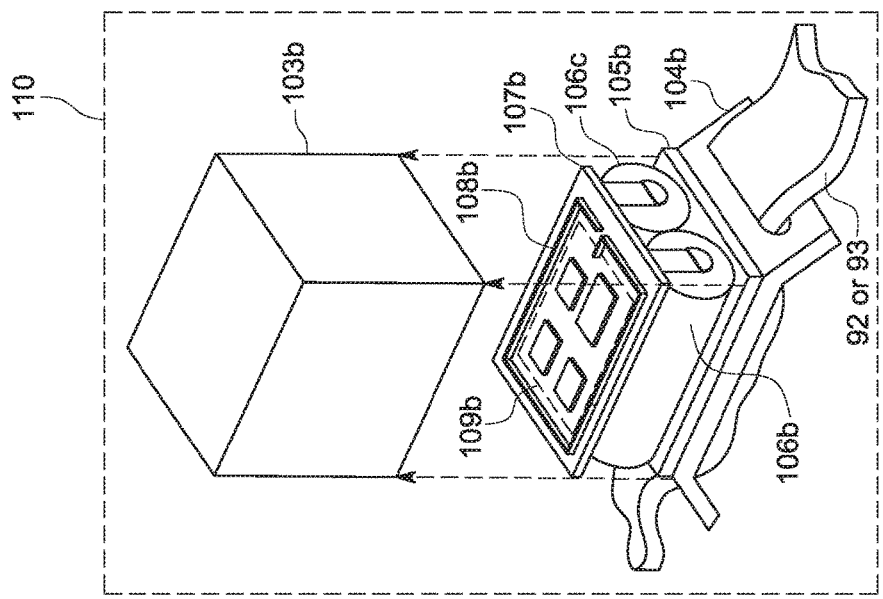
FIG. 4 is an exploded schematic of a second pet identification/location RF transmitting module that can be utilized in the system of FIG. 1 in the form of a module attached to the back of a pet collar.

Referring to FIG. 4, the pet identification/location RF transmitting module 110 is illustrated. The module 110 is attached to the back of a pet collar according to another exemplary embodiment. The pet identification/location RF transmitter module 110 is securely attached to the actual collar portion of either pet collar 92 or pet collar 93, which is hung around the neck of the pet 90 to be monitored. The RF transmitter module 110 consists of a top cover 103b and a bottom cover 104b, which snap together in use. The bottom cover 104b contains component parts as enumerated in the following description. There is an o-ring 105b to keep out moisture and contaminants from the inside of the module, when the top and bottom covers are snapped together. There are two cylindrical batteries 106b and 106c which are electrically connected in series and supply power to the module. The printed circuit board 107b contains the module's electronic circuitry and electronic components 109b, as well as the module's RF transmitting antenna 108b. Either pet collar 92 or pet collar 93 (depending upon the exemplary embodiment chosen) is slid between the openings (or slots) in the two phalanges on the bottom cover 104b of the RF transmitter module 110, so as to securely attach the module 110 to the collar.

Figure 5:
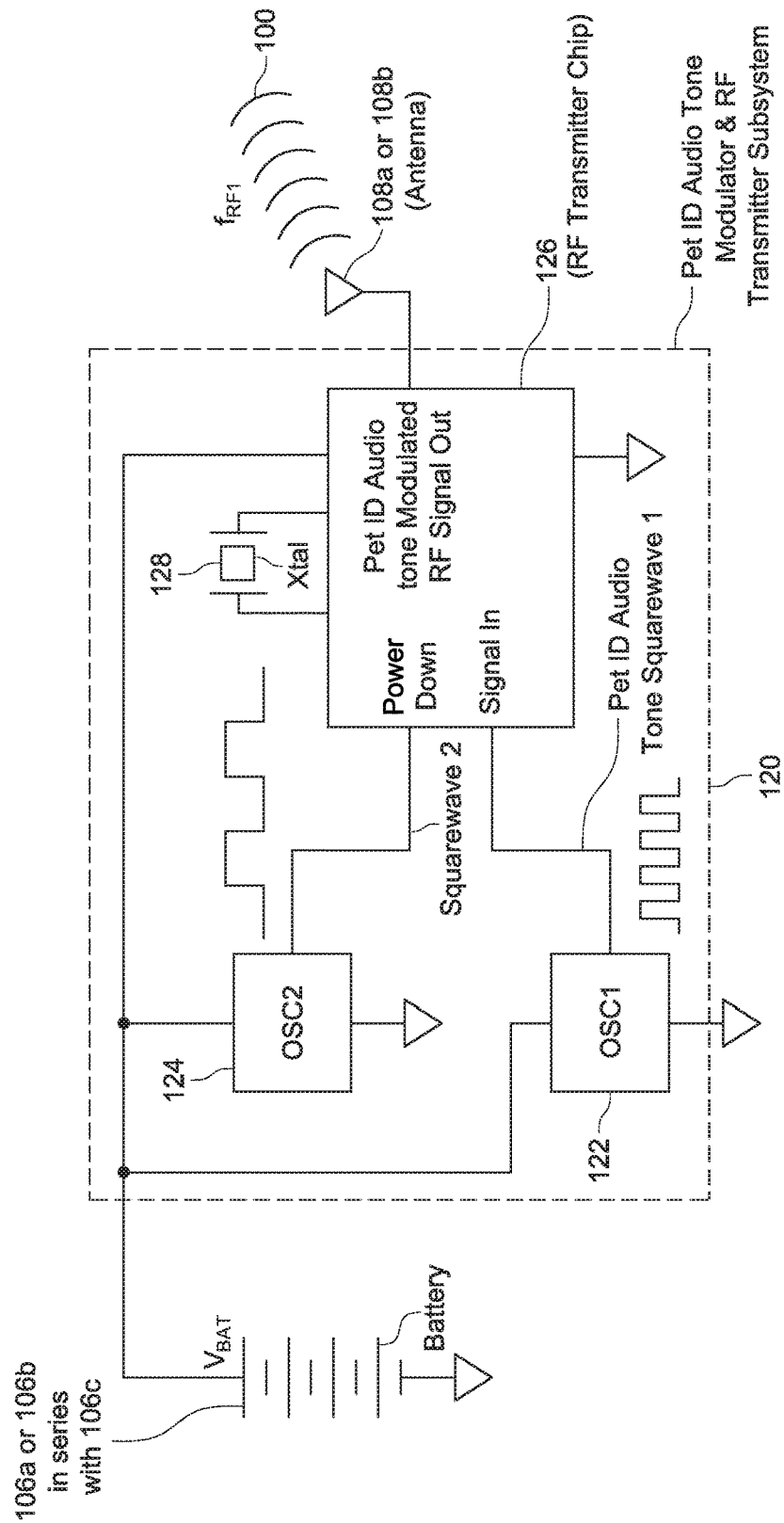
FIG. 5 is a schematic of an electronic system utilized in either the first pet identification/location RF transmitting module of FIG. 3 or the second pet identification/location RF transmitting module of FIG. 4.

Referring to FIG. 5, the electronic system included in either the pet identification/location RF transmitter module 96 (shown in FIG. 3) or the module 110 (shown in FIG. 4) is illustrated. The electronic system shown in FIG. 5 is identical for either the pet RF transmitter module 96 or the pet RF transmitter module 110. First, the modules 96 and 110 are battery operated. In the "dog tag" module 96, the battery is a coin cell 106a. In the module 110, the battery consists of cylindrical battery 106b in series with cylindrical battery 106c. Both of these battery arrangements create voltage $V_{BAT}$, which supplies power to pet ID audio tone modulator and RF transmitter subsystem 120, which contains all the components within dashed line box 120 in FIG. 5. Included within subsystem 120 are two oscillators. The oscillator 122, labeled OSC1, produces the unique Pet ID audio tone (Squarewave 1) that identifies the particular pet wearing module 96 or module 110. The frequency of this audio tone could be in a range of 4,000 Hz or 9,000 Hz. The second oscillator 124, labeled OSC2, produces a much slower frequency, named Power "On/Off" Squarewave 2, which turns the RF transmitter chip 126 on and off to save battery power. The Squarewave 2 may be 15 milliseconds (ms) on and 15 ms off. The RF transmitter chip 126 uses a crystal 128 to produce the Module's RF frequency, which may be 915 MHz. The RF transmitter chip 126 also contains a modulator section to modulate the RF frequency with the pet ID audio tone to create modulated RF signal 100 ($f_{RF1}$). The modulated RF signal 100 is sent to either antenna 108a (in RF transmitter module 96), or antenna 108b (in RF transmitter module 110) so as to be transmitted to the RF antennas 52 and 58 of the right and left pillar assemblies 32, 34, as shown in FIG. 1.

It is noted that the RF power transmitted from either the pet identification/location RF transmitter module 96 or the module 110 is very low, so as to comply with FCC Part 15.209. The FCC Part 15.209 states that as long as the RF field strength from a transmitter that is transmitting at any frequency from 200 MHz to approximately 3 GHz and is at or below 200 µVolts per meter at 3 meters from the transmitting antenna, then any kind of modulation can used by the transmitter, including continuous modulation or modulation with no specified on/off times. Thus, the power transmitted from RF transmitter module 96 or the RF transmitter module 110 will be empirically reduced to comply with FCC Part 15.209, as previously stated.

Figure 6:
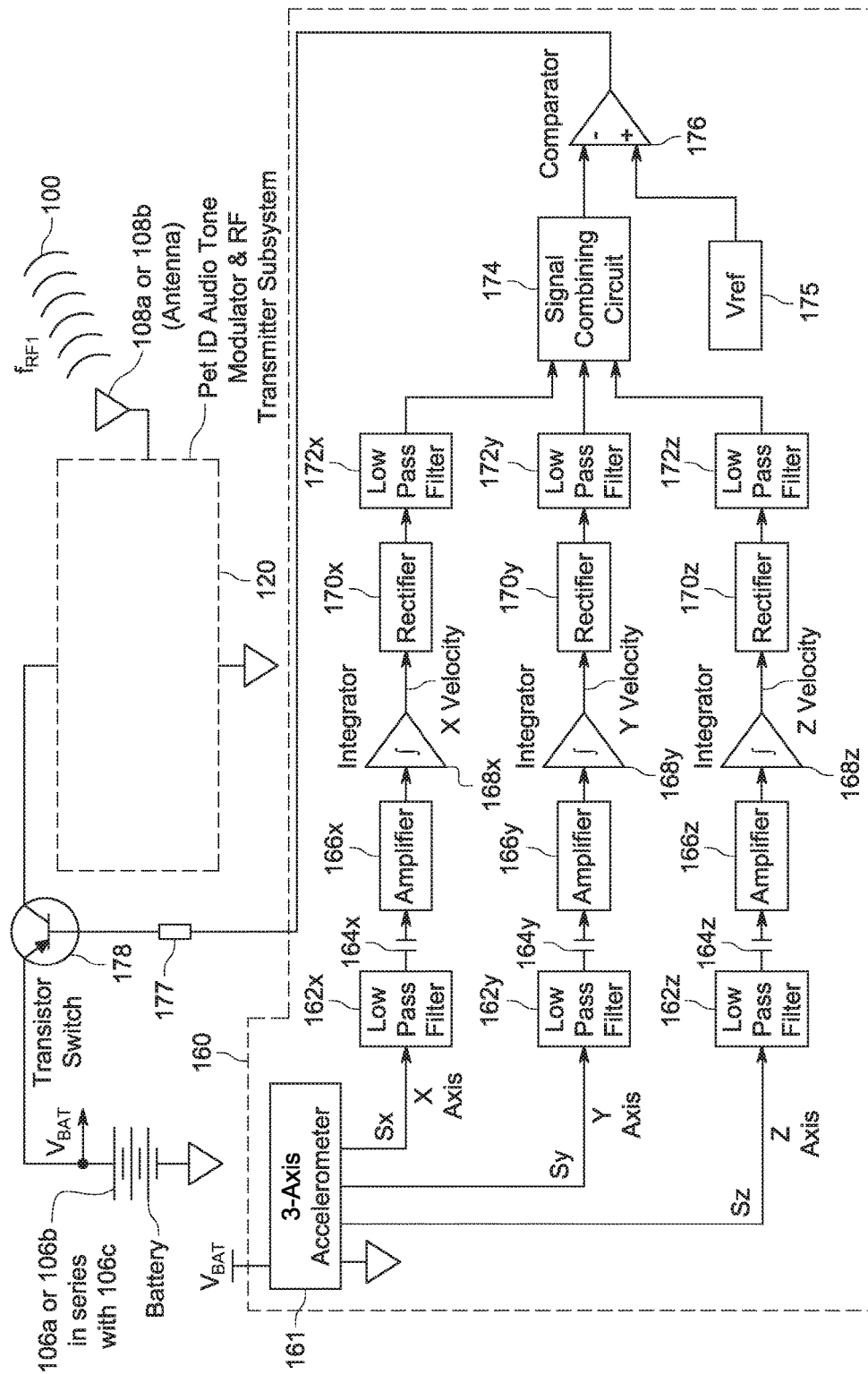
FIG. 6 is a schematic of the electronic system utilized in either the first pet identification/location RF transmitting module of FIG. 3 or second pet identification/location RF transmitting module of FIG. 4, which includes an accelerometer/velocity pet movement detection subsystem in order to prohibit RF transmissions when the pet is not moving, so as to save battery power in the RF transmitting modules.

Referring to FIG. 6, the electronic system included in either pet identification/location RF transmitting module 96 (of FIG. 3) or the module 110 (of FIG. 4) (which also includes an added accelerometer/velocity pet movement detection subsystem 160, in addition to the electronics described in FIG. 5, in order to save battery power in the RF transmitting modules) is illustrated.

In this embodiment, the vibration sensor 161 is a small, 3-axis accelerometer, mounted to the surface of a PC board holding the electronic circuitry thereon. The raw signal outputs (Sx, Sy, Sz) of vibration sensor 161 are directly related to the movement, or more correctly, the mathematical first derivative of the movement (i.e., the acceleration)) of pet 90, the pet being monitored. For the purposes of this discussion, only the x-axis signal path will be described; however, the y-axis and z-axis have signal paths that are identical, with identical components for each path being labeled x, y, and z respectively. The signal Sx is first sent to low pass filter 162x and then through DC (direct current) blocking capacitor 164x to signal conditioning amplifier 166x. The alternating current (AC) portion of the acceleration sensor signals (Sx, Sy, Sz) is utilized because the AC signals are an indication of the movement of pet 90. The DC portion of most new accelerometers is an indication of the earth's gravitational acceleration, and is often used for measurements of angle, which can be ignored. In this embodiment, the gains of amplifiers 166x, 166y, and 166z are determined empirically so as to provide the optimum gain with no output saturation for the movement of the particular pet 90 being monitored. The amplified AC output signal from amplifier 166x is sent to mathematical integrator 168x. Mathematically integrating the acceleration signal from vibration sensor 161 provides the true velocity signal of pet 90. It also helps eliminate as much unwanted high frequency mechanical and electrical noise as possible, and the high frequency bias inherent in the output signal from an accelerometer vibration sensor.

The output of the mathematical integrator 168x is sent to rectifier 170x. In this embodiment, the rectifiers 170x, 1704y, and 1704z are full-wave precision rectifiers, but less precise half-wave rectifiers can be used. The output of rectifier 170x goes to low pass filter 172x to remove as much AC ripple as possible from the full-wave rectified velocity signal. Thus, the output of low pass filter 172x (Velpetx) is a slowly moving DC voltage whose amplitude is directly related to the amplitude of the velocity (movement) in the x-axis of the pet being monitored. Similarly, the output amplitudes of low pass filter 172y (Velpety) and low pass filter 172z (Velpetz) are directly related to the velocity (movement) in the y-axis and z-axis, respectively, of the pet being monitored. These signals (Velpetx, Velpety, and Velpetz) are now combined in the signal combining circuit 174, as discussed below, to yield a combined pet velocity signal output called "Velsig."

In this exemplary embodiment, the signal combining circuit 174 derives the output "Velsig" according to the following equation (often called the "square root of the sum of the squares" equation):

$$\text{Velsig}=K_1*\text{SQRT}[(\text{Velpetx})^2+(\text{Velpety})^2+(\text{Velpetz})^2]$$

$K_1$, is a constant, which is empirically derived, such that "Velsig" does not saturate for reasonable values of Velpetx, Velpety, and Velpetz. The term SQRT refers to a square root mathematical function.

The output of signal combining circuit 174, "Velsig," is sent to the negative input of comparator 176. The purpose of comparator 176 is to trip low when the amplitude of a velocity of the pet 90 being monitored is above some predetermined value. This means the pet is not at rest and is moving at some minimum sustained velocity, to be determined empirically. The comparator 176 has a small amount of hysteresis, produced by using a small amount of positive feedback around the comparator, to reduce false triggering. The positive input of comparator 176 is connected to "trip-point" reference voltage Vref 175, which is directly related to the minimum sustained velocity of the pet needed to determine that the pet is in motion. (As stated above, this value is to be determined empirically). When the output of comparator 176 goes low, it pulls resistor 177 down and turns on transistor switch 178, which then applies voltage $V_{BAT}$, that is created by battery 106a or battery 106b in series with battery 106c, to pet ID audio tone modulator and RF transmitter subsystem 120. The subsystem 120 then performs exactly as discussed in the description of FIG. 5, and transmits modulated RF radio frequency 100 (or $f_{RF1}$) from antenna 108a or antenna 108b to RF radio receiver antennas 58 and 52 on the right and left pillar assemblies 32 and 34 respectively. Thus, the accelerometer/velocity pet movement detection subsystem 160 saves battery power in RF transmitting module 96 and RF transmitting module 110 by powering down the pet ID audio tone modulator and RF transmitter subsystem 120 and eliminating RF radio transmissions, while the pet being monitored is at rest.

Figure 7:
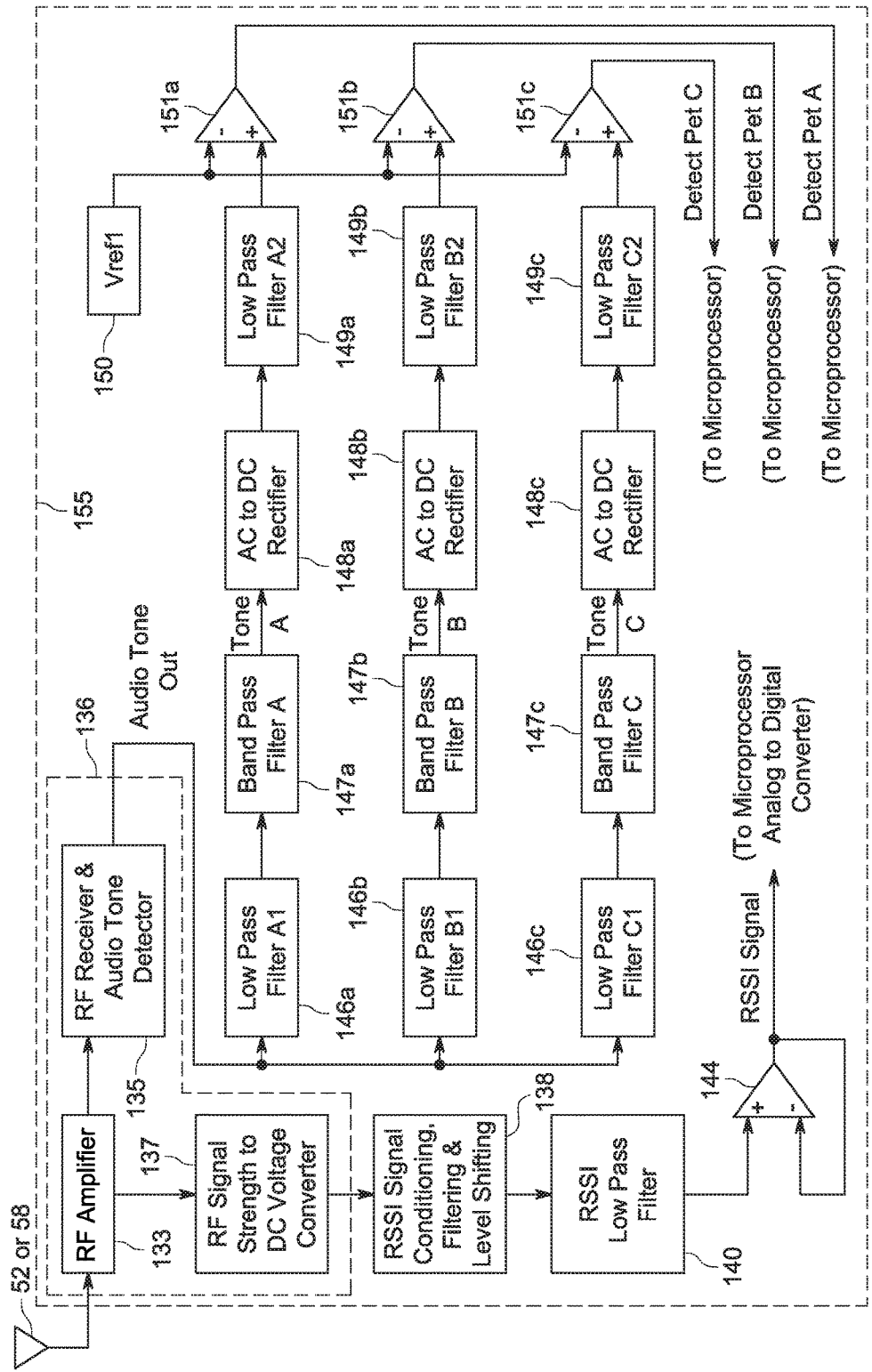
FIG. 7 is a schematic of the pet identification/location RF receiver subsystem included in both of the right and left pillar assemblies of FIG. 1.

Referring to FIG. 7, the electronic pet identification/location RF receiver subsystem 155 included in the electronic systems of both the right and left pillar assemblies 32, 34 is illustrated. FIG. 7 illustrates the RF receiver subsystem 155 in a general manner using component descriptive numerals. However, it refers to both the left receiver subsystem and the right receiver subsystem, which are identical in structure. One RF receiver subsystem is placed in each of the pillar assemblies 32, 34. By adding the letter "L" to all of the descriptive numerals shown in FIG. 7, then FIG. 7 will apply to the RF receiver subsystem 155L in the left pillar assembly 34. By adding the letter "R" to all the descriptive numerals shown in FIG. 7, then FIG. 7 will apply to the RF receiver subsystem 155R in the right pillar assembly 132.

The components and the operation of the pet identification/location RF receiver subsystem 155, shown in FIG. 7, will now be explained. Specifically, the RF receiving antenna 52 (or RF receiving antenna 58) provides an incoming RF signal to an RF amplifier 133 that is part of RF receiver chip 136. The RF receiving antennas 52 and 58 are looking for the RF signal 100 ($f_{RF1}$) transmitted from either pet identification/location RF transmitting module 96 or the module 110. The RF amplifier 133 amplifies the received signal and provides this amplified signal to two circuits. First the signal goes to RF receiver and audio tone detector 135 which extracts the actual tone, which was transmitted by pet RF transmitter module 96 or module 110. This detected tone is then provided to three separate identical circuits to ascertain which pet, or pets, has transmitted the identification tone, which will be discussed in more detail below. The RF amplifier 133 also provides its amplified received RF signal to an RF signal strength the DC voltage converter 137, which converts the strength of the received RF signal to a proportional DC voltage, referred to herein as the RSSI value. This conversion is normally a log-linear relationship, whereby the RSSI value is a DC voltage that is proportional to the strength of the received RF signal as measured in dBm. The RSSI value is appropriately filtered and amplified to eliminate electrical noise and produce a good signal strength average, according to methods that are well known in the art, by signal conditioning circuit 138. Then the RSSI signal is sent to RSSI low pass filter 140 and on to buffer/voltage follower 144. The output of buffer 144 is then sent to the input of the microprocessor analog to digital converter subsystem.

The audio tone output of the RF receiver chip 136 will now be explained. This audio tone output is provided to three separate identical circuits to ascertain which pet, or pets, has transmitted the identification tone. For the purposes of this discussion, only the A-Tone signal path will be described; however, the B-Tone and C-Tone signals have signal paths that are identical, with identical components for each path being labeled a, b, and c respectively. Also note that: (1) the A-Tone is the identification tone of the pet A, which may be 2,500 Hz; (2) the B-Tone is the identification tone of the pet B, which may be 4,000 Hz; and the C-Tone is the identification tone of the pet C, which may be 9,000 Hz. The audio tone output is first sent to the low pass filter A1 146a and then to band pass filter A 147a, which has a center frequency of the identification tone (frequency) of the pet A. The output of the band pass filter A 147a, which is a clean frequency A-Tone, is sent to the AC to DC rectifier 148a. In this embodiment, the AC to DC Rectifiers 148a, 148b, and 148c are full-wave precision rectifiers, but less precise half-wave rectifiers can be used. The output of the AC to DC rectifier 148a goes to the low pass filter A2 149a to remove as much AC ripple as possible from the full-wave rectified signal. Note that if the pet A did not send the identification signal received by the RF receiver chip 136, the output amplitudes of the AC to DC rectifier 148a and the low-pass filter A2 149a will be virtually zero. If the pet A did send the identification signal received by the RF receiver chip 136, the output amplitudes of the AC to DC rectifier 148a and the low-pass filter A2 149a will be quite high. The output of the low-pass filter A2 149a is sent to the positive input of the comparator 151a. The negative input of the comparator 151a is connected to "trip-point" reference voltage Vref1 150, which is some midpoint voltage value to be determined empirically such that a properly detected tone will trip the comparator 151a high, and the lack of a properly detected tone will not trip the comparator 151a. The comparator 151a has a small amount of hysteresis, produced by using a small amount of positive feedback around the comparator, to reduce false triggering. The comparators 151b and 151c also have a similar small amount of hysteresis. In other words, the output of the comparator 151a, which is named Detect PetA, will provide a correct and true detection of the A-Tone signal, and it is sent to the proper microprocessor input. Similarly, the B-Tone and C-Tone signal paths and the outputs of comparator 151b (Detect PetB) and comparator 151c (Detect PetC) will provide correct and true detection of the B-Tone and C-Tone signals to the proper microprocessor inputs.

Figure 8:
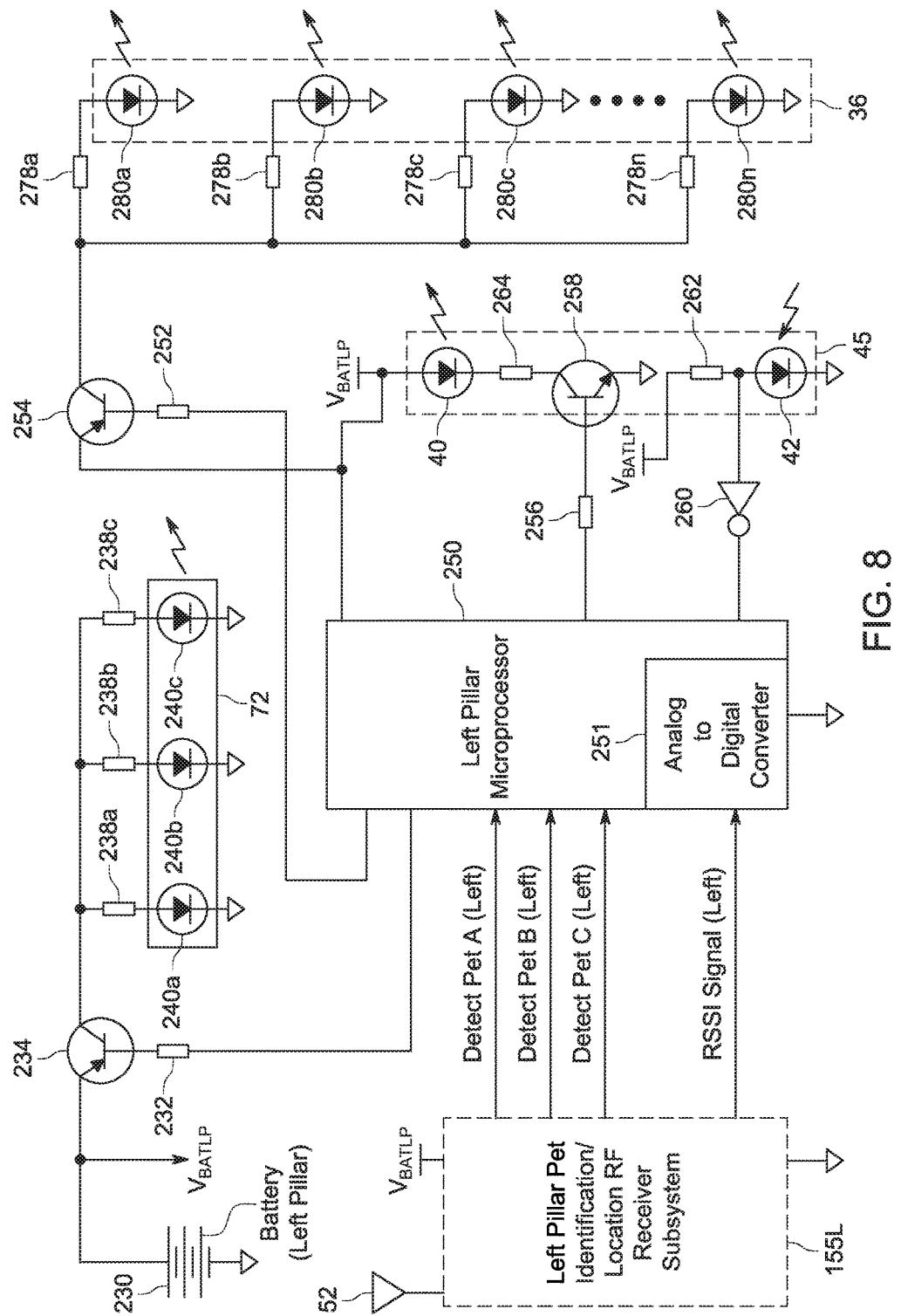
FIG. 8 is a schematic of the left pillar assembly of FIG. 1.

Referring to FIG. 8, the electronic system included in the left pillar assembly 34 will be explained. The left pillar assembly includes a battery 230, which in this embodiment consists of four D-cell batteries in series. However, a rechargeable battery pack could be used instead, whose re-charger could be plugged into a 120 VAC outlet. The battery 230 produces voltage $V_{BATLP}$ to provide power to all the electronic components of the left pillar assembly 34. The left pillar assembly 34 further includes a microprocessor 250. The microprocessor 250 includes read only memory (ROM), random-access memory (RAM), a central processing unit (CPU), and an analog to digital converter (ADC) module 251 with at least an 8 bit output. The microprocessor 250 has several inputs and outputs and is also utilized to implement the infrared light beam communications link 44 (shown in FIG. 1), which transmits data to, and receives data from the right pillar assembly 32. The left pillar assembly 34 includes components that implement the infrared light beam communications link 44 which are encompassed by dashed line box 45. The right pillar assembly 32 receives data through the communications link 44 via an infrared light beam that is detected by the infrared photo diode detector 42 in conjunction with the pull-up resistor 262. The infrared photo diode detector 42 sends the received signal to buffer/inverter 260. The buffer/inverter 260 sends the data to an input of the microprocessor 250 in the left pillar assembly 34. The right pillar assembly 32 send data to the left pillar assembly 34 by having the microprocessor 250 generating signals through the resistor 256 to the transistor 258, which turns on and off the infrared photo diode 40 through the pull-down resistor 264.

Referring to FIG. 8, the flashing LED warning light 72 includes three high intensity red LEDs (labeled LED 240a, LED 240b, and LED 240c) that are electrically connected in parallel. The flashing LED warning light 72 is placed on the upper portion of left pillar assembly 34, and is a visual warning meant to deter the pet from entering the restricted keep-out area 24. It is turned on and off by sending an on/off signal from an output of left pillar microprocessor 250 through pull-down resistor 232 to transistor switch 234, which, when on, provides voltage $V_{VBATLP}$ to pull-up resistors 238a, 238b, and 238c and, thus, simultaneously turns on red LEDs 240a, 240b, and 240c respectively.

Four inputs to the microprocessor 250 in the left pillar assembly 32 come directly from the pet identification/location RF receiver subsystem 155L (or RF receiver subsystem 155L, for short) in the left pillar assembly 32. The input to the RF receiver subsystem 155L is the RF antenna 52 in the left pillar assembly 34, whose sole purpose is to receive the RF radio transmission 100 emanating from the pet identification/location RF transmitter module 96 or the module 110. When sufficient signal strength of the RF radio transmission 100 is detected by the RF receiver subsystem 155L in the left pillar assembly 34, then the RF receiver subsystem 155L performs several actions. In particular, the RF receiver subsystem 155L determines if the audio identification tones of pet A, pet B, and pet C are detected and sends such detection signals to microprocessor 250 in the left pillar assembly 34. The RF receiver subsystem 155L also continuously sends the received RF signal strength of RF radio transmission 100 (i.e., the RSSI signal strength value of the received RF radio transmission 100) to analog to digital converter module 251 of the microprocessor 250 in the left pillar assembly 34. These received signals are then sent over infrared light beam communications link 44 to the right pillar assembly 32 and its associated microprocessor 300.

In order to save the battery power of battery 230 in the left pillar assembly 34, the infrared photo diode array 36 is controlled (i.e. turned on and off) by an output of the microprocessor 250 using a transistor switch 254. When microprocessor 300 of the right pillar assembly 32 sends a signal through the infrared light beam communications link 44 to turn on the infrared photo diode array 36, then an output of the microprocessor 250 goes low and pulls down the resistor 252, which then turns on the transistor switch 254. This provides voltage $V_{BATLP}$ to the pull-up resistors 278a, 278b, 278c . . . 278n and, thus, turns on the infrared light LEDs 280a, 280b, 280c . . . 280n, respectively, which comprise the infrared photo diode array 36. The infrared light beams from these infrared light LEDs are sent across the portal opening to corresponding infrared light detector LEDs on the right pillar assembly 32.

Also, all the electronic components of the left pillar assembly 34 are contained in a small protective housing 48 to protect the components from mechanical damage and to reduce the likelihood of contaminants impairing the operation of the electronics.

Figure 9:
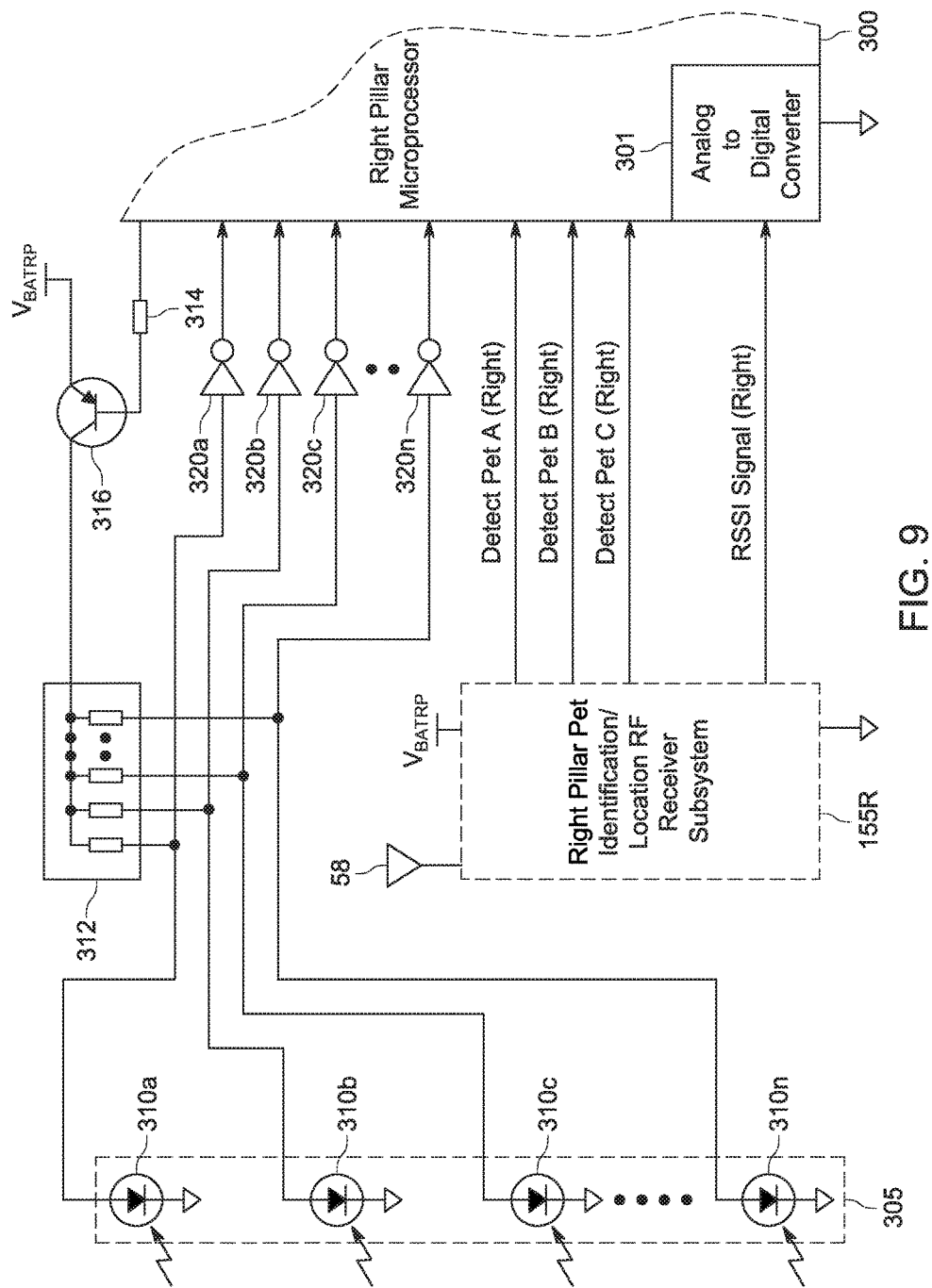
FIG. 9 is a schematic of a portion of the right pillar assembly of FIG. 1 that has the pet identification/location RF receiver subsystem.

Referring to FIG. 9, the electronic system included in the right pillar assembly 32 will be explained. The right pillar assembly 32 includes a microprocessor 300. The microprocessor 300 includes a read only memory (ROM), a random-access memory (RAM), a central processing unit (CPU), and an analog to digital converter (ADC) module 301 with at least an 8 bit output. The microprocessor 300 has several inputs and outputs described hereinafter.

Four inputs to the microprocessor 300 come directly from the pet identification/location RF receiver subsystem 155R (or only RF receiver subsystem 155R, for short) in the right pillar assembly 32. The input to RF receiver subsystem 155R is the RF antenna 58, whose sole purpose is to receive the RF radio transmission 100 emanating from the pet identification/location RF transmitter module 96 or the module 110. When sufficient signal strength of RF radio transmission 100 is detected by RF receiver subsystem 155R, then this subsystem performs several actions. In particular, the RF receiver subsystem 155R determines if the audio identification tones of pet A, pet B, and pet C are detected and sends such detection signals to the microprocessor 300. The RF receiver subsystem 155R also continuously sends the received RF signal strength of RF radio transmission 100 (i.e., the RSSI signal strength value of the received RF radio transmission 100) to analog to digital converter module 301 of the microprocessor 300.

In order to save the battery power of the battery 330 in the right pillar assembly 32, the infrared photodetector diode array 305 is controlled (i.e. turned on and off) by an output of the microprocessor 300 using a transistor switch 316. When the microprocessor 300 determines to turn on infrared photodetector diode array 305, then an output of the microprocessor 300 goes low and pulls down resistor 314, which then turns on a transistor switch 316. The transistor switch 316 provides voltage $V_{BATRP}$ to the pull-up resistors in pull-up resistor array 312 and, thus, provides power to infrared photodetector diodes 310a, 310b, 310c . . . 310n, which comprise the infrared photodetector diode array 305. The signals from these infrared photodetector diodes 310a, 310b, 310c . . . 310n are sent to the inputs of buffer/inverters 320a, 320b, 320c . . . 320n, respectively. The outputs of the buffer/inverters 320a, 320b, 320c . . . 320n are then sent to inputs of the microprocessor 300, which makes a determination as to which infrared light beam has been blocked by a pet.

Figure 10:
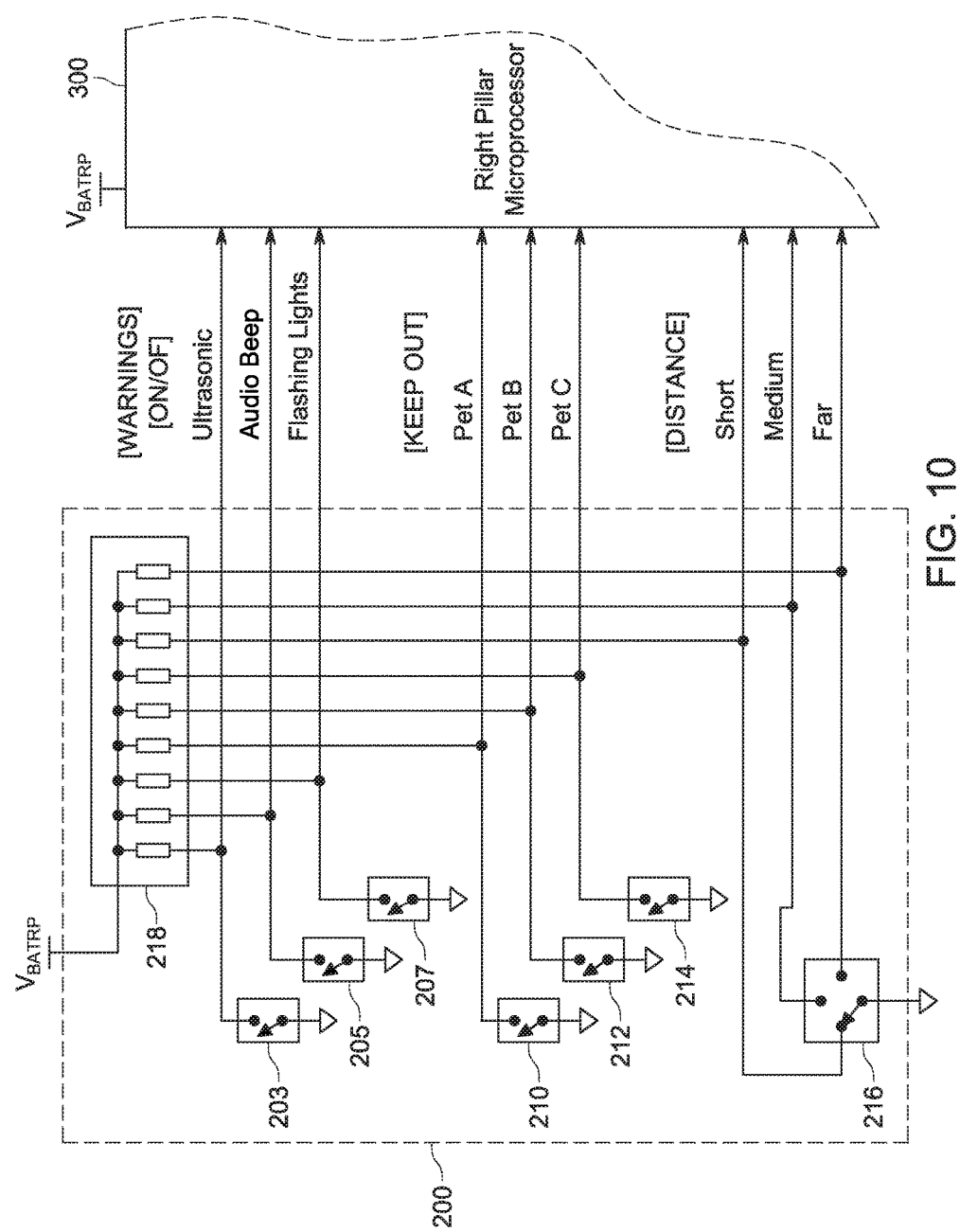
FIG. 10 is a schematic of a subsystem of selection switches included in the right pillar assembly of FIG. 1.

Referring to FIG. 10, the electronic selection switch subsystem 200 that is included the right pillar assembly 32 will be explained. The selection switch subsystem 200 is part of a control panel 205 placed on the right pillar assembly 32. There are several aspects common to all the selector switches shown in FIG. 10. First, each of the switches needs a "pull-up" resistor, which pulls the switch output terminal to the battery voltage ($V_{BATRP}$). These "pull-up" resistors are provided by resistor array 332, which contains nine such resistors in FIG. 10. Each of the resistors has one terminal attached to a common node inside resistor array 332, which is connected to $V_{BATRP}$, while the other terminal is connected to a terminal of a switch and to an input of the microprocessor 300 of the right pillar assembly 32. The other terminal of each switch is connected to ground. When the switch is left open (Off or No), the switch signal provided to the input of the microprocessor 300 of the right pillar assembly 32 is $V_{BATRP}$ (or high). Thus, in this embodiment, all the digital inputs to the microprocessor 300 of the right pillar assembly 32 from all the switches shown in FIG. 10 are "active low" inputs, meaning a low signal from the switch indicates that the choice represented by that switch has been selected by the user.

The following is a table defining each of the switches shown in FIG. 10:

| Switch/Signal Name | Switch Description/Number | Switch Signal Name |
|---|---|---|
| [ON/OFF WARNING] | | |
| ON/OFF Ultrasonic Sound | SPST Switch 203 | Ultrasonic |
| ON/OFF Audio Beep | SPST Switch 205 | Audio Beep |
| ON/OFF Flashing Lights | SPST Switch 207 | Flashing Lights |
| [YES/NO KEEP-OUT PET] | | |
| YES/NO PET A | SPST Switch 210 | PET A |
| YES/NO PET B | SPST Switch 212 | PET B |
| YES/NO PET C | SPST Switch 214 | PET C |
| [PORTAL DISTANCE] | | |
| SHORT (Approx. 3 FT.) | Rotary Switch 216-- Pos. 1 | SHORT |
| MEDIUM (Approx. 4.5 FT.) | Rotary Switch 216-- Pos. 2 | MEDIUM |
| FAR (Approx. 6 FT.) | Rotary Switch 216-- Pos. 3 | FAR |

The meaning of each of the above-identified switches will now be explained. The first three single pole, single throw (SPST) switches turn on or off the three types of pet warning, or pet deterrent, signals on the pillar assemblies. The SPST switch 203 turns on or off an ultrasonic sound warning signal, which is meant to deter the pet from entering the restricted keep-out area 24, and which emanates from right pillar assembly 32. The SPST switch 205 turns on or off an audible audio-beeping sound warning signal, which is meant to deter the pet from entering the restricted keep-out area 24, and which also emanates from right pillar assembly 32 only. The SPST switch 207 turns on or off flashing LED warning lights, which are a visual warning meant to deter the pet from entering the restricted keep-out area 24. These flashing LED warning lights are placed on the upper portion of both the left pillar assembly 34 and the right pillar assembly 32. Any one, two, or three of these warning methods may be selected by these switches.

The second batch of three switches determines which pet is to be restricted from entering the keep-out area 24. The SPST switch 210 determines if pet A will be restricted from the keep-out area 24, the SPST switch 212 determines if pet B will be restricted from the area, and the SPST switch 214 determines if pet C will be restricted from the keep-out area 24. Any one, two, or three of the pets may be selected to be restricted from entering the keep-out area 24 by these switches.

The position of rotary switch 216 determines the approximate portal opening distance to be chosen for a given set up of the pet location monitoring and deterrent system 20. This selection also determines approximately how far out in front of the portal opening: (1) a pet will be monitored, and (2) a warning will be given to the pet to deter its entrance into the restricted keep-out area 24. The rotary switch 216—Pos. 1 selects a SHORT portal distance (a portal opening, and a warning distance in front of the portal) of approximately 3 feet. The rotary switch 216—Pos. 2 selects a MEDIUM portal distance (a portal opening, and a warning distance in front of the portal) of approximately 4.5 feet. The rotary switch 216—Pos. 3 selects a FAR portal distance (a portal opening, and a warning distance in front of the portal) of approximately 6 feet. In actuality, the RF Receiver sensitivity and the corresponding RSSI signal levels, for the RF receivers of both the right and left pillar assemblies 32, 34 will be modified using these rotary switch 216 position selections.

All the switch selection signals described herein from the electronic selection switch subsystem 200 will be fed to inputs of the microprocessor 300 of the right pillar assembly 32. The microprocessor 300 will then make the proper electronic selections and produce the proper electrical outputs as required by the switches.

Figure 11:
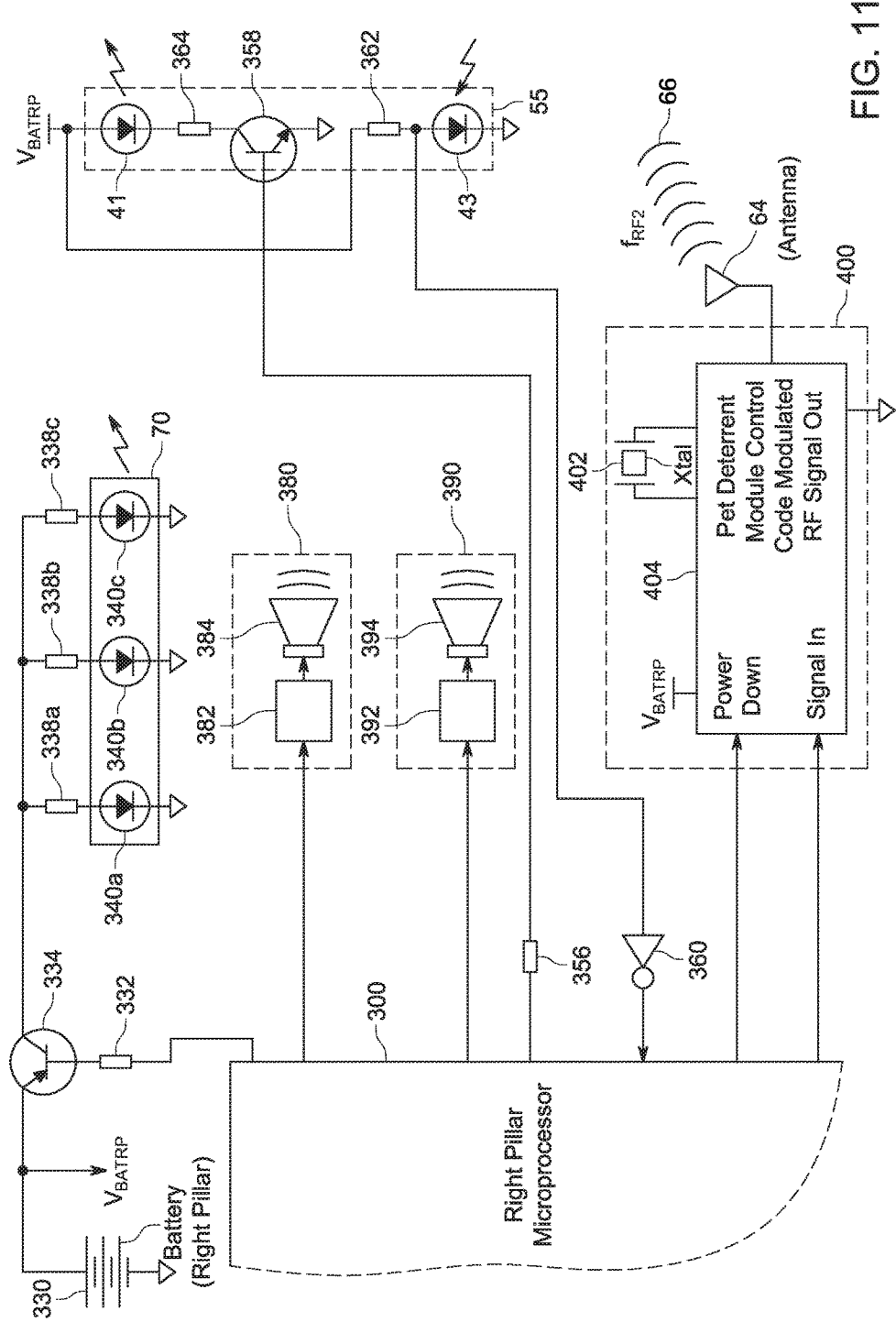
FIG. 11 is a schematic of a remaining portion of the right pillar assembly of FIG. 1.

Referring to FIG. 11, a remaining portion of the electronic system included in the right pillar assembly 32 will be explained. The right pillar assembly 32 includes a battery 330, which in this embodiment consists of four D-cell batteries in series. However, a rechargeable battery pack could be used instead, whose re-charger could be plugged into a 120 VAC outlet. The right pillar assembly 32 further implements an infrared light beam communications link 44 (shown in FIG. 1), which allows data to be transmitted and received from left pillar assembly 34. The components on the right pillar assembly 32 which implement that infrared light beam communications link are encompassed by dashed line box 55 (shown in FIG. 11). The right pillar assembly 32 receives data from the left pillar assembly 34 via an infrared light beam that is detected by infrared photo diode detector 43 in the right pillar assembly 32 in conjunction with pull-up resistor 362. The infrared photo diode detector 43 then sends the received signal to buffer/inverter 360. The buffer/inverter 360 sends the data to an input of the microprocessor 300. The right pillar assembly 32 transmits data through the communications link 44 by the microprocessor 300 outputting signals through the resistor 356 to the transistor 358, which turns on and off the infrared photo diode 41 through the pull-down resistor 364.

Also shown in this portion of FIG. 11 is the flashing LED warning light 70, which consists of three high intensity red LEDs (named LED 340a, LED 340b, and LED 340c) electrically connected in parallel. The flashing LED warning light 70 is placed on the upper portion of the right pillar assembly 32, and is a visual warning meant to deter the pet from entering the restricted keep-out area 24. It is turned on and off by sending an on/off signal from an output of microprocessor 300 through pull-down resistor 332 to the transistor switch 334, which, when on, provides voltage $V_{VBATRP}$ to the pull-up resistors 338a, 338b, and 338c and, thus, simultaneously turns on red LEDs 340a, 340b, and 340c respectively.

The microprocessor 300 in the right pillar assembly 32 also controls two other types of pet warning, or pet deterrent, signals placed on the right pillar assembly 32 for what is known as the "stand-alone" embodiment. This embodiment uses pet warnings, or pet deterrents, meant to deter the pet from entering the restricted keep-out area 24, that come only from the pillar assemblies themselves. This embodiment uses only a pet collar 93 on the pet 90 being monitored and does not use the pet collar 92, which has attached RF receiver and electric-shock/vibration module 94. The first of these methods is ultrasonic warning sound subsystem 380, which produces very high frequency ultrasonic sound waves (at approximately 38 kHz) emanating from right pillar assembly 32 only. This subsystem consists of an ultrasonic transducer 384, which is driven by ultrasonic electronics module 382, which is controlled from an output of microprocessor 300 of the right pillar assembly 32. The second of these methods is an audible audio-beeping sound warning subsystem 390, whose sound emanates from the right pillar assembly 32 only. The subsystem 390 includes an audio speaker 394, which is driven by audio electronics module 392, which is controlled from an output of the microprocessor 300.

When another exemplary embodiment uses the pet collar 92, which has an attached RF receiver/deterrent module 94 (containing electric-shock and vibration deterrent methods) as the means to deter the pet from entering the restricted keep-out area 24, then subsystem 380 and subsystem 390 are eliminated from the right pillar assembly 32. Instead, the RF control code transmitter 400 is added to right pillar assembly 32. The RF control code transmitter 400 includes an RF control code transmitter chip 404 and a crystal 402, which is used to develop RF radio frequency $f_{RF2}$. The RF control code transmitter chip 404 also includes a subsystem to modulate RF radio frequency $f_{RF2}$ with the proper pet deterrent control code signal. This signal is sent to the chip 404 from an output of the right pillar microprocessor 300. The properly modulated RF radio signal is sent to RF control transmitter antenna 64 to transmit deterrent codes at RF frequency $f_{RF2}$ to the RF receiver/deterrent module 94 (attached to the pet's deterrent collar 92). The deterrent codes will identify a pet ID, a pet deterrent method such as electric-shock and/or vibration, and a level of severity of the electric-shock and/or vibration that will be utilized by the collar. The correctly modulated RF frequency $f_{RF2}$ is numbered 66 in FIG. 1 and, here, in FIG. 11. Please note that, as previously stated, the pet RF transmitter frequency $f_{RF1}$ and RF control transmitter frequency $f_{RF2}$ are not the same RF frequency, but are completely different. Also note that microprocessor 300 in the right pillar assembly 32 sends a signal to RF control code transmitter chip 404 to power down when RF control code transmissions are not needed, so as to save battery power.

Figure 12:
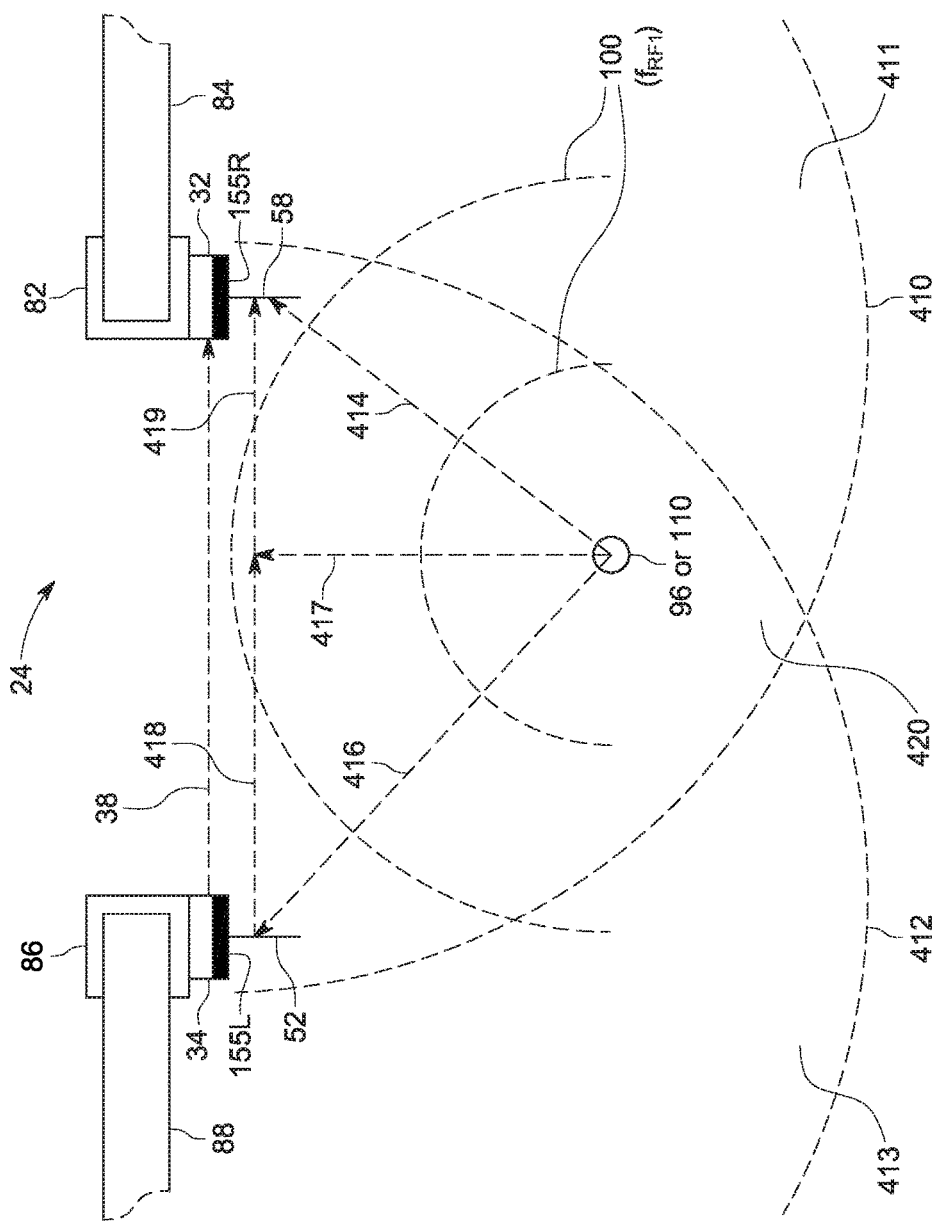
FIG. 12 is a schematic of the RF receiving pattern of the left and right pet identification/location RF receiving antennas (located in the left and right pillar assemblies), as well as the RF transmitting pattern of the pet identification/location RF transmitting module attached to a pet.

Referring to FIG. 12, a depiction of the RF receiving pattern of the left and right pet identification/location RF receiving antennas 52 and 58 (located in the left and right pillar assemblies 34, 32), as well as the RF transmitting pattern of pet identification/location RF transmitting module 96 or the module 110, attached to a pet is illustrated. Either the RF transmitting module 96 or the module 110 is selected at the discretion of the pet's owner. Both are electrically identical, act as identical RF transmitters, and are interchangeable.

Referring to FIG. 12, a doorway portal into a keep-out zone 24 is illustrated. The right pillar assembly 32 is attached to right doorjamb 82 which is then attached to right wall 84 of the doorway. The RF receiving antenna 58 is aimed straight out (at 90°) from the plane of right wall 84 and into the area directly in front of keep-out zone 24. Similarly, the left pillar assembly 34 is attached to left doorjamb 86 which is then attached to left wall 88 of the doorway. The RF receiving antenna 52 is in aimed straight out (at 90°) from the plane of left wall 88 and into the area directly in front of keep out zone 24. Also, the infrared light beams (designated as infrared light beam array 38) are sent from the left pillar assembly 34 to the right pillar assembly 32. In addition, the infrared light beam communications link 44 (not shown in FIG. 12) provides communication between the right pillar assembly 32 and the left pillar assembly 34, and transmits data such as RSSI data values and command signals therein.

The RF receiving antennas 52 and 58 are monitoring for the RF signal 100 ($f_{RF1}$) transmitted from either the pet identification/location RF transmitting module 96 or the module 110. The farthest distance that right RF receiving antenna 58 can detect the RF signal 100 is approximately the dashed line 410. The receiving area between the dashed line 410 and the RF receiving antenna 58 is designated the RF receiving area 411. The farthest distance that the left RF receiving antenna 52 can detect the RF signal 100 is approximately the dashed line 412. The receiving area between the dashed line 412 and the RF receiving antenna 52 is designated the RF receiving area 413. The area in which RF receiving area 411 and RF receiving area 413 overlap (i.e., both antennas can simultaneously receive the RF signal 100 transmitted from the pet) is designated the overlapping RF receiving area 420. This area is roughly triangular-shaped employees directly out from the portal opening to the restricted keep-out area 24. When the pet enters the overlapping RF receiving area 420, the distances shown with dashed arrows are continuously calculated by the microprocessor 300 of the right pillar assembly 32, using the RSSI signals, which are continuously updated, from both the right and left RF receiver subsystems 155L and 155R. Note that the RSSI signal from the left RF receiver subsystem 155L is sent from the left analog to digital converter module 251 to an output of the microprocessor 250 of the left pillar assembly 34 and then through the infrared light beam communications link 44 to the microprocessor 300 of the right pillar assembly 32. The right RSSI signal provides a rough value of the distance from the pet RF transmitter module 96 or module 110 to the right RF receiving antenna 58, which is designated distance 414 in FIG. 12. The left RSSI signal provides a rough value of the distance from the pet RF transmitter module 96 or module 110 to the left RF receiving antenna 52, which is designated as distance 416 in FIG. 12. In the exemplary embodiment shown in FIG. 12, the opening of the door is approximately 30 inches, and the distance between the RF receiving antenna 58 and the RF receiving antenna 52 is approximately 33 inches. The distance 418 and distance 419, therefore, add up to 33 inches. Using all these values of distance and the mathematics of trigonometry, the distance 417 can be approximately calculated. The distance 417 is the approximate distance from the pet to the portal entrance into keep-out area 24. The distance 417 determines what warnings (or deterrents) and their severity are applied to the pet in the exemplary embodiments. In general, as the distance 417 gets smaller and smaller, the severity and intensity of the warnings to the pet (such as the amplitude of the electric-shock deterrent or the volume of the ultrasonic warning sound) increase.

Figure 13:
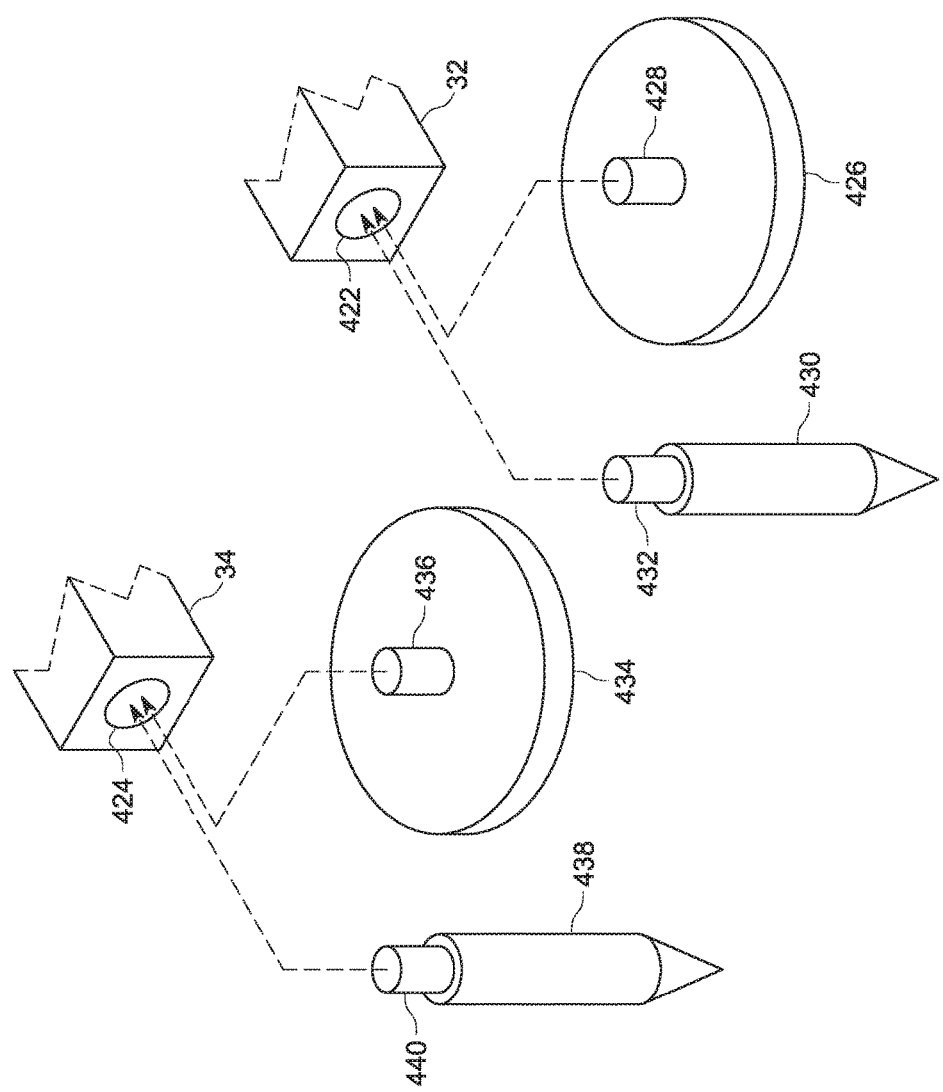
FIG. 13 is a schematic of optional attachments for the left and right pillar assemblies of FIG. 1.

Referring to FIG. 13, the optional attachments for the right and left pillar assemblies 32, 34 will be described. The optional attachments allow the right and left pillar assemblies 32, 34 to stand vertically either indoors or outdoors. In particular, FIG. 13 illustrates an alternative method of setting up the right and left pillar assemblies 32, 34 when the pet owner may not want the pet to enter an area, for example, between a couch and an armchair. To accomplish this, one exemplary embodiment provides for an attachment to the bottom of the right and left pillar assemblies 32, 34, which is a heavy round base pushed up into a pillar assembly into an opening in the base of the pillar assembly which is about one inch in diameter and several inches deep. Attached to the center of the top of the heavy round base is a male plug (or cylinder) that mates with the opening in the bottom of the pillar assembly and is about one inch in diameter and several inches high. This plug is pushed up into the matching hole in the bottom of the pillar assembly, attaching the heavy round base to the pillar assembly, and providing a base upon which the pillar assembly can be supported upright. With these heavy base attachments, the right and left pillar assemblies 32, 34 can then be set on the floor at the end of the armchair and the end of the couch and aimed at each other in such a manner so as to allow the transmitting infrared diode array in the left pillar assembly 34 to send its infrared light beams directly to the receiving infrared diode array of the right pillar assembly 32. The alignment does not have to be a perfect alignment, but the alignment should be relatively close so that the infrared beams lineup reasonably well.

FIG. 13 illustrates another alternative method of setting up the right and left pillar assemblies 32, 34 when the pet owner may not want the pet to enter an area outside in the backyard. The heavy round bases could be removed from the bottom of the pillar assemblies. In their place, plastic stakes could be used. Attached to the center of the top of the stake is a male plug (or cylinder) that mates with the opening in the bottom of the pillar assembly and is about one inch in diameter and several inches high. This plug is pushed up into the matching hole in the bottom of the pillar assembly, attaching the plastic steak to the bottom of the pillar assembly. This would then allow the whole pillar assembly to be pounded into the ground or soil at a distance that the pet owner requires. For example, if the pet owner wants to deter the pet from entering a keep-out area between a garage and a building, the plastic mounting stakes could be used. This would allow the right and left pillar assemblies 32, 34 to be pounded into the ground at either side of the opening between the garage and the building. The pillar assemblies would need to be aimed at each other in such a manner so as to allow the pillar transmitting infrared diode array in the left pillar assembly 34 to send its infrared light beams directly to the receiving infrared diode array of the right pillar assembly 32, but again this does not have to be a perfect alignment.

Referring to FIG. 1, the operation of the right and left pillar assemblies 32, 34 will now be described.

The following devices and subsystems described immediately herein after are held in common in both the first exemplary embodiment and the second exemplary embodiments. First is an RF transmitter module, which is known as the "dog tag" version of a pet identification/location RF transmitter module. This battery operated module looks similar to a "dog tag." It transmits a very low power RF radio frequency signal, which is modulated with a particular tone (in the audio frequency range) that is associated only with the pet wearing the module and, thus, identifies the pet transmitting it. This signal is called the pet identification/location RF signal and, as previously stated, is transmitted by the pet's RF transmitter module on radio frequency $f_{RF1}$ to both the right and left pillar assemblies 32, 34. The portal opening is defined in all embodiments by the right and left pillar assemblies 32, 34, which are at either side of the doorway entrance into the restricted keep-out area 24. In the first exemplary embodiment, the RF transmitter module is attached to the buckle of a special electric shock and vibration collar, and is placed around the neck of the pet to provide electric shock and vibration as a deterrent to the pet being monitored. In the second exemplary embodiment, the RF transmitter module is attached to the buckle of a collar, and is placed around the neck of the pet to be monitored, but contains no electric shock or vibration deterrent methods. In both exemplary embodiments, each pillar assembly contains an RF receiver antenna and an associated RF radio receiver, which is monitoring for the pet identification/location RF signal sent out by the RF transmitter module of the pet. When this RF signal is received by both the antennas in the right and left pillar assemblies 32, 34, the electronics in each RF radio receiver determines: (1) which pet is transmitting the RF signal identification tone, and (2) approximately how far the pet is from the RF radio receivers using a feature of the RF radio receiver integrated circuit known as the received signal strength indication or RSSI output. Once the pet is within the receiving range of each of the RF radio receivers of the right and left pillar assemblies 32, 34, a determination is made by the microprocessor of the right pillar assembly 32 that the pet is located at a "far away" distance from the portal entrance. Again in both exemplary embodiments, the right pillar assembly 32 then sends a signal to the left pillar assembly 34 (over an infrared communications link between the right and left pillar assemblies 32, 34) to turn on the infrared diode transmitting array of the left pillar assembly 34. The infrared diode transmitting array now sends beams of infrared light across the portal opening to an infrared photo diode detector array on the right pillar assembly 32. This gives the system the capability to detect when a pet crosses the threshold into the restricted keep-out area 24.

The operation of the first exemplary embodiment will now be described. The first exemplary embodiment, as previously stated, uses a special electric shock and vibration collar and is placed around the neck of the pet to be monitored. On the back of this collar is a module which: (1) has methods to provide vibration and electric shock to the back of the pet wearing the collar (so as to modify the behavior of the pet), and (2) contains an RF radio receiver to receive RF radio control signals (that originally were meant to be sent from a hand held RF transmitter by the pet owner, but now, in this system, will be sent from the RF control signal transmitter of the right pillar assembly 32 (to the collar of the pet) to control the vibration and electric shock previously described. These RF radio control signals determine whether to use vibration and/or electric shock, and to determine the magnitude of these deterrent/warning methods, so as to keep the pet from entering the keep-out area 24. As previously stated, in this exemplary embodiment, the right pillar assembly 32 utilizes the RF control signal transmitter to send control signals to the collar of the pet. The "dog tag" version of the pet identification/location RF transmitter module is attached to the buckle of the special electric shock and vibration pet collar. This RF transmitter module sends out the modulated RF signal with the pet identification tone for that particular pet. The RF receiving antennas and RF receiver modules on the right and left pillar assemblies 32, 34 are monitoring for the pet identification/location RF signal. When the microprocessor in the right pillar assembly 32, using the RSSI signals from the RF receiver modules, determines that the pet is within the RF receiving range of both pillar assembly RF receiving antennas, in a location considered to be "far away," several things happen. First, as previously described, the infrared diode transmitting array on the left pillar assembly 34 sends beams of infrared light across the portal opening to the infrared photo diode detector array on the right pillar assembly 32. Secondly, the microprocessor in the right pillar assembly 32 turns on the flashing warning lights, and sends a control code through the RF control code transmitter and antenna on the right pillar assembly 32 to the RF receiver/deterrent module on the back of the pet special collar to begin both mild vibration and mild electric shock. When the pet continues toward the entrance of the portal into the keep-out area 24, and the RSSI signal from both RF receiving antennas gets larger, the microprocessor in the right pillar assembly 32 flashes the flashing warning lights faster and sends a control code through the RF control code transmitter to the RF receiver/deterrent module of the pet to increase the intensity of both the vibration and electric shock given to the pet. As the pet continues toward the entrance of the keep-out area 24, the RF receivers in the right and left pillar assemblies 32, 34 determine that the pet is very close to the portal entrance. The microprocessor flashes the lights even faster and transmits a control signal through the RF control code transmitter to give an even stronger electric shock and more violent vibration at almost maximum value to the pet to deter its entrance into the keep-out area 24. Once the pet crosses the portal infrared beams, that were turned on when the pet was first detected by the RF receivers, and blocks some number "q" of the infrared beams, the microprocessor determines that the pet has crossed into the keep-out area 24. The flashing warning lights are made to flash at their maximum rate and the microprocessor transmits a control signal through the RF control code transmitter to provide the pet with the maximum value of electric shock and most violent vibration allowed. This is an attempt to teach the pet to stay out of the keep-out area 24. These maximum values of electric shock and vibration are continued for some number "k" of seconds (to be determined). If the pet backs out of and exits from the keep-out area 24 before "k" seconds has elapsed, and the RF radio receivers on both pillar assemblies 32, 34 detect that the pet is now again in front of the portal entrance, the microprocessor in the right pillar assembly 32 makes the determination that the pet has left the keep-out area 24. It then turns off the flashing warning lights and sends a control signal through the RF control code transmitter to the RF receiver module on the back of the pet to stop all electric shock and vibration.

The second exemplary embodiment does not use a special RF receiving electric shock and vibration collar on the pet. The "dog tag" version of the pet identification/location RF transmitter module is attached to the buckle of this pet collar. As before, it sends out the modulated RF signal with the pet identification tone for that particular pet. In this exemplary embodiment, the right pillar assembly 32 does not contain an RF transmitter to control the deterrent module on the back of the pet collar, since there is no controlled pet collar in this version. Therefore, there are only RF receiving antennas and modules on the right and left pillar assemblies 32, 34 monitoring for the pet identification/location RF signal. When the microprocessor in the right pillar assembly 32 determines that the pet is within the RF receiving range of both pillar assembly RF receiving antennas, in a location considered to be "far away," several things happen. First, as previously described, the infrared diode transmitting array on the left pillar assembly 34 sends beams of infrared light across the portal opening to the infrared photo diode detector array on the right pillar assembly 32. Secondly, the microprocessor in the right pillar assembly 32 turns on the flashing warning lights attached thereto, and turns on an audio beeping warning sound at low amplitude. When the pet continues toward the entrance of the portal into the keep-out area 24, the flashing warning lights become faster and the audio beeping warning sound becomes faster and the amplitude of the lights and the warning sound are increased. In addition, an ultrasonic sound, which is only heard by the pet and not by humans, is turned on. As the pet continues toward the entrance of the keep-out area 24, the RF receivers in both pillar assemblies 32, 34 determine that the pet is very close to the portal entrance. The ultrasonic sound increases in amplitude, the audio beeping becomes louder and faster, and the flashing warning lights become faster. Once the pet crosses the portal infrared beams, that were turned on when the pet was first detected by the RF receivers, and blocks some number "q" of the infrared beams, a very loud maximum amplitude ultrasonic sound is sent out, the audio beeping sound beeps at its fastest rate and loudest amplitude, and the flashing warning lights flash at their maximum rate. This is an attempt to teach the pet to stay out of the keep-out area 24. If the pet continues on into the keep-out area 24, the very loud ultrasonic sound, the loud audio beeping, and the flashing warning lights are continued for some number "k" of seconds (to be determined). If the pet backs out of and exits the keep-out area 24 before "k" seconds has elapsed, and the RF radio receivers on both pillar assemblies 32, 34 detect that the pet is now back in front of the portal entrance, the microprocessor in the right pillar assembly 32 makes the determination that the pet has left the keep-out area 24. The microprocessor then turns off all the warning signals, including the high amplitude ultrasonic sound, the loud audio beeping, and the flashing warning lights.

The right pillar assembly 32 has an attached control panel that selects various parameters to be used by a particular embodiment. This control panel is adjusted by the pet owner before either of the embodiments described above is used. For example, in an embodiment there may be up to "m" pets that could possibly be restricted from entering the keep-out area 24. In the embodiments described above, the number "m" is three. Any one, two, or three of these pets may be selected to be prevented from entering the keep-out area 24 by selecting the correct switch or switches from the set of switches on the control panel. The pet owner uses the control panel to select which pet tone (or tones) are to be detected by the RF receivers and the microprocessor, so that the correct pet (or pets) is (or are) sent deterrent signals in an attempt to keep the pet(s) from entering the keep-out area 24.

The second selection choice on the control panel determines which detection ranges or distances between the right and left pillar assemblies 32, 34 will be used in the operational of the system. The pillar assemblies 32, 34 can be set up for three detection ranges or distances: (1) approximately 3 feet between pillars; (2) approximately 4.5 feet between pillars; and (3) approximately 6 feet between pillars. The selection of the distance between the pillar assemblies 32, 34 also affects the farthest distance at which the pet can be detected in front of the portal opening. In case (1) above, the distance between the pillar assemblies 32, 34 may be approximately 3 feet, but this would mean that the pet could be detected somewhat less than 3 feet in front of the right and left pillar assemblies 32, 34. In case (2) above, the distance between the right and left pillar assemblies 32, 34 may be approximately 4.5 feet, but this would mean that the pet could be detected somewhat less 4 feet in front of the right and left pillar assemblies 32, 34. In case (3) above, the distance between the right and left pillar assemblies 32, 34 may be approximately 6 feet, but this would mean that the pet could be detected somewhat less 5 feet in front of the right and left pillar assemblies 32, 34. This option would most likely be used in front of a door wall, i.e., preventing the pet from slamming into a door wall, which is typically about 70 inches wide.

The third selection choice on the control panel determines which warnings or deterrents the pet owner wants to use in the exemplary embodiment. For example, in the first exemplary embodiment, the pet owner may wish to have flashing warning lights as well as the RF control signal being sent to the RF deterrent collar module. So the pet owner could turn the flashing light warning method on or off. Or in another embodiment, the pet owner could turn on or off the use of electric shock on the collar of the pet. In the second embodiment described above, the pet owner could turn the flashing light warning method on or off, or could turn the audio beeping warning method on or off, or could turn the ultrasonic warning method on or off.

The attachment or placement of the pillar assemblies can be broken into three methods. If the pillar assemblies are to be used with a doorway entrance, which has door jams and is usually about 30 inches wide, the pillar assemblies 32, 34 can be attached to the door jams by double-sided sticky tape. In this embodiment the transmitting infrared diode array of the left pillar assembly 34 would be aimed at the receiving infrared diode array of the right pillar assembly 32 with almost no adjustment required.

The second method of setting up the pillar assemblies 32, 34 could be used when the pet owner may not want the pet to enter an area between a couch and an armchair. To accomplish this, one exemplary embodiment provides for an attachment to the bottom of the pillar assemblies, which is a heavy round base pushed up into the pillar assembly into an opening in the base of the pillar assembly which is about one inch in diameter and several inches deep. Attached to the center of the top of the heavy round base is a male plug (or cylinder) that mates with the opening in the bottom of the pillar assembly and is about one inch in diameter and several inches high. This plug is pushed up into the matching hole in the bottom of the pillar assembly, attaching the heavy round base to the pillar assembly, and providing a base upon which the pillar assembly can be supported upright. With these heavy base attachments, the pillar assemblies 32, 34 can then be set on the floor at the end of the armchair and the end of the couch and aimed at each other in such a manner so as to allow the transmitting infrared diode array of the left pillar assembly 34 to send its infrared light beams directly to the receiving infrared diode array of the right pillar assembly 32. There does not have to be a perfect alignment, but it should be fairly close so that the infrared beams lineup reasonably well.

The third method of setting up the pillar assemblies 32, 34 could be used when the pet owner may not want the pet to enter an area outside in the backyard. The heavy round bases could be removed from the bottom of the pillar assemblies. In their place, plastic stakes could be used. Attached to the center of the top of the stake is a male plug (or cylinder) that mates with the opening in the bottom of the pillar assembly and is about one inch in diameter and several inches high. This plug is pushed up into the matching hole in the bottom of the pillar assembly, attaching the plastic steak to the bottom of the pillar assembly. This would then allow the pillar assemblies 32, 34 to be pounded into the ground or soil at a distance that the pet owner requires. For example, if the pet owner wants to deter the pet from entering a keep-out area 24 between a garage and a building, the plastic mounting stakes could be used. This would allow the pillar assemblies 32, 34, to be pounded into the ground at either side of the opening between the garage and the building. The pillar assemblies 32, 34 would need to be aimed at each other in such a manner so as to allow the transmitting infrared diode array of the left pillar assembly 34 to send its infrared light beams directly to the receiving infrared diode array of the right pillar assembly 32.

Figure 14:
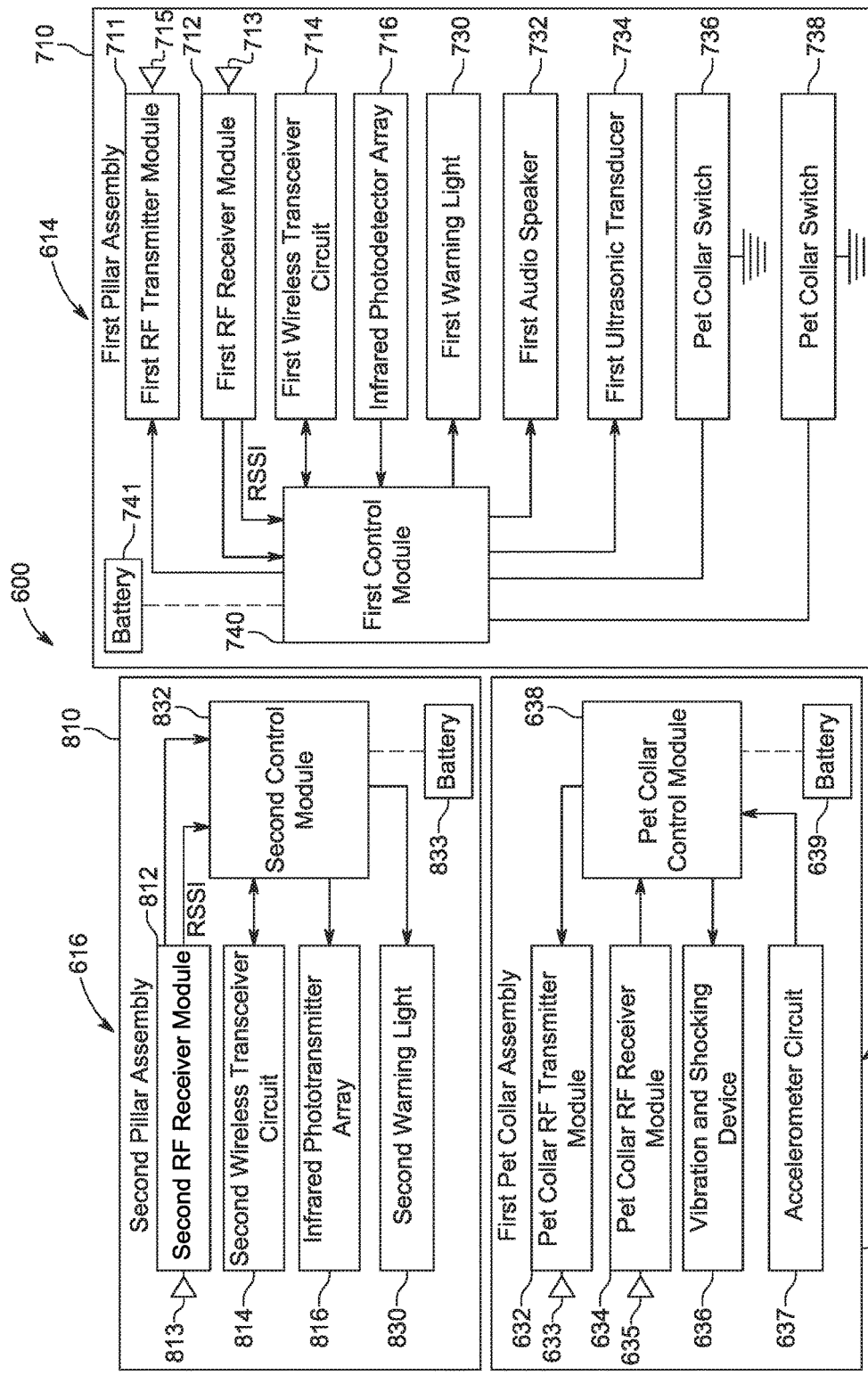
FIG. 14 is a schematic of a pet location monitoring and deterrent system having a first pet collar assembly, a first pillar assembly, and a second pillar assembly in accordance with another exemplary embodiment.
Figure 16:
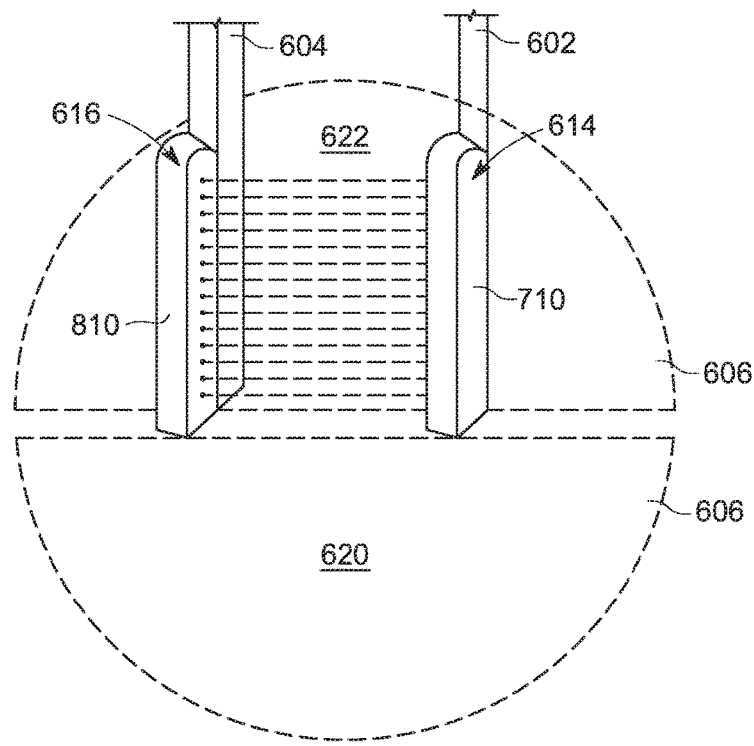
FIG. 16 is a schematic of the first and second pillar assemblies of FIG. 14 which define a warning area and a keep-out area.

Referring to FIGS. 14 and 16, a pet location monitoring and deterrent system 600 in accordance with another exemplary embodiment is provided. The system 600 is provided to prevent a pet from entering a keep out area 622 behind of and proximate to the first and second pillar assemblies 614, 616. When the pet is detected in the warning area 620 which is in front of and proximate to the first and second pillar assemblies 614, 616, the pillar assemblies 614, 616 alert the pet via emitted light, emitted sound, and emitted ultrasonic sound that the pet is entered the warning area 620. If the pet continues moving forward toward the first and second pillar assemblies 614, 616 and blocks infrared light beams transmitted between the first and second pillar assemblies 614, 616 and enters the keep out-area 622 that is behind and proximate to the first and second pillar assemblies 614, 61, the pet is further warned via emitted light, emitted sound, and emitted ultrasonic sound. Further, the first pillar assembly 614 may transmit a wireless message to a pet collar worn by the pet to command that the pet collar to vibrate and shock the pet.

Figure 15:
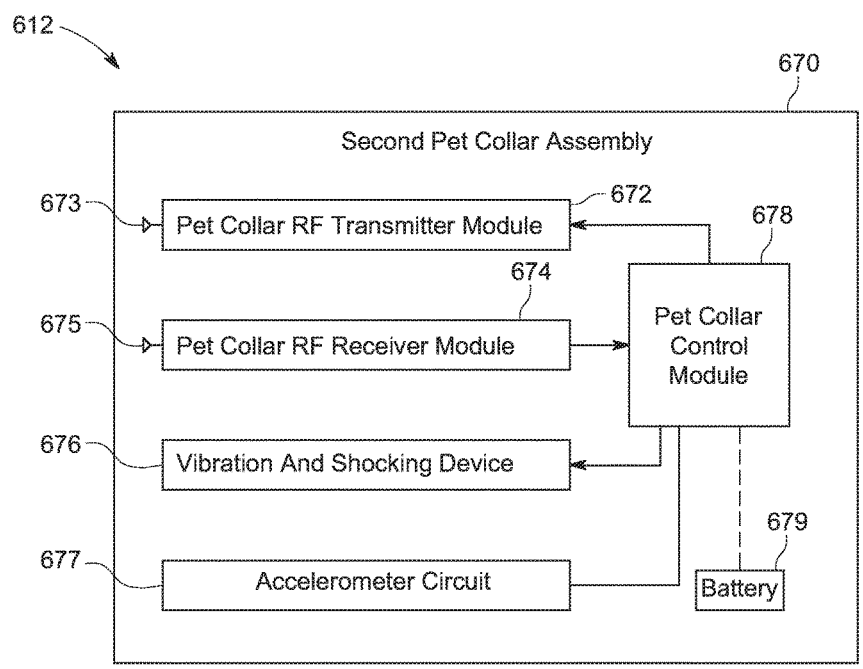
FIG. 15 is a schematic of a second pet collar assembly utilized in the pet location monitoring and deterrent system of FIG. 14.

Referring to FIGS. 14 and 15, the pet location monitoring and deterrent system 600 includes a first pet collar assembly 610, a second pet collar assembly 612, a first pillar assembly 614, and a second pillar assembly 616.

Figure 17:
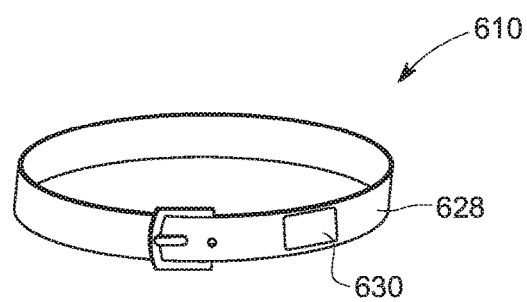
FIG. 17 is another schematic of the first pet collar assembly of FIG. 1.

Referring to FIGS. 14 and 17, the pet collar assembly 610 is provided to be worn by a first pet. The pet collar assembly 610 includes a pet collar 628, a housing 630, a pet collar RF transmitter module 632, a pet collar RF receiver module 634, a vibration and shocking device 636, an accelerometer circuit 637, and a pet collar control module 638, and a battery 639.

The pet collar 628 is sized to fit around a neck of the first pet. The housing 630 is attached to the pet collar 628 and holds the pet collar RF transmitter module 632, the pet collar RF receiver module 634, the vibration and shocking device 636, and the pet collar control module 638 therein.

The pet collar RF transmitter module 632 transmits an RF signal from an antenna 633 wherein the RF signal identifies the first pet collar assembly 610. In an exemplary embodiment, the RF signal is modulated utilizing a specific audio tone frequency (discussed above) which identifies the first pet collar assembly 610. In an alternative embodiment, the RF signal is modulated to contain a specific digital ID which identifies the first pet collar assembly 610. The pet collar RF transmitter module 632 is operably coupled to the pet collar control module 638 and is controlled by the module 638.

The pet collar RF receiver module 634 receives RF signals at an antenna 635 from the right pillar assembly 614 that contain commands for controlling operation of the first pet collar assembly 610. In an exemplary embodiment, a first received RF signal has a first pet collar ID and a first digital command code which instructs the pet collar control module 638 to command the vibration and shocking device 636 to vibrate, and to shock the first pet at a first intensity level for a first predetermined time interval. Further, a second received RF signal has the first pet collar ID and a second digital command code which instructs the pet collar control module 638 to command the vibration and shocking device 636 to vibrate, and to shock the first pet at a second intensity level for a second predetermined time interval, wherein the second intensity level is greater than the first intensity level. The pet collar receiver module 634 is operably coupled to the pet collar control module 638 and sends received command codes to the module 638.

The vibration and shocking device 636 is provided to vibrate and to shock the first pet if commanded to do so. The vibration and shocking device 636 is operably coupled to the pet collar control module 638 and is controlled by the module 638.

The accelerometer circuit 637 is provided to generate a movement signal when the pet wearing the first pet collar assembly 610 is moving, that is received by the pet collar control module 638. When the pet collar control module 638 does not receive the movement signal from the accelerometer circuit 637 for a predetermined time interval, the pet collar control module 638 enters a sleep-mode to conserve power from the battery 639. Thereafter, when the pet collar control module 638 receives the movement signal from the accelerometer circuit 637, the pet collar control module 638 enters a wake-up mode and performs the operational steps discussed herein.

The pet collar control module 638 is provided to control operation of the first pet collar assembly 610. In an exemplary embodiment, the pet collar control module 638 includes a microcontroller and a memory device operably coupled to the microcontroller. The microcontroller executes software stored in the memory device to control the operation of the first pet collar assembly 610.

The battery 639 is electrically coupled to the pet collar RF transmitter module 632, the pet collar RF receiver module 634, the vibration and shocking device 636, the accelerometer circuit 637, and the pet collar control module 638 and provides electrical power thereto.

Figure 18:
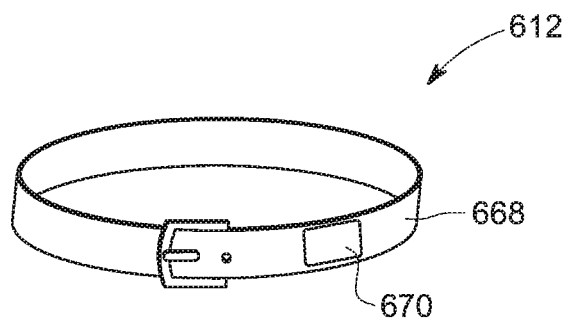
FIG. 18 is another schematic of the second pet collar assembly of FIG. 15.
Figure 19:
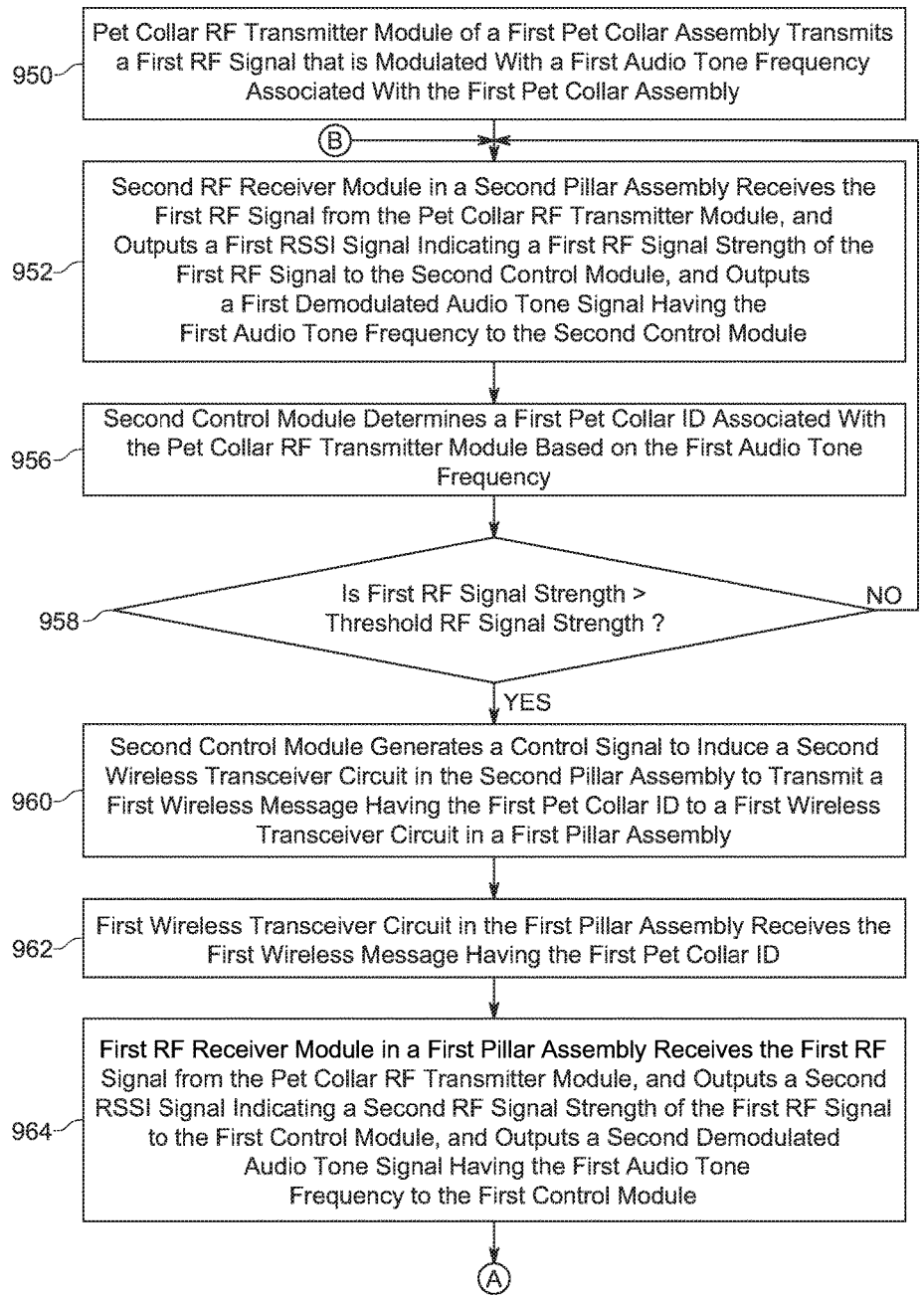
FIGS. 19-22 are flowcharts of a method for monitoring a location of a first pet collar assembly in accordance with another exemplary embodiment.
Figure 20:
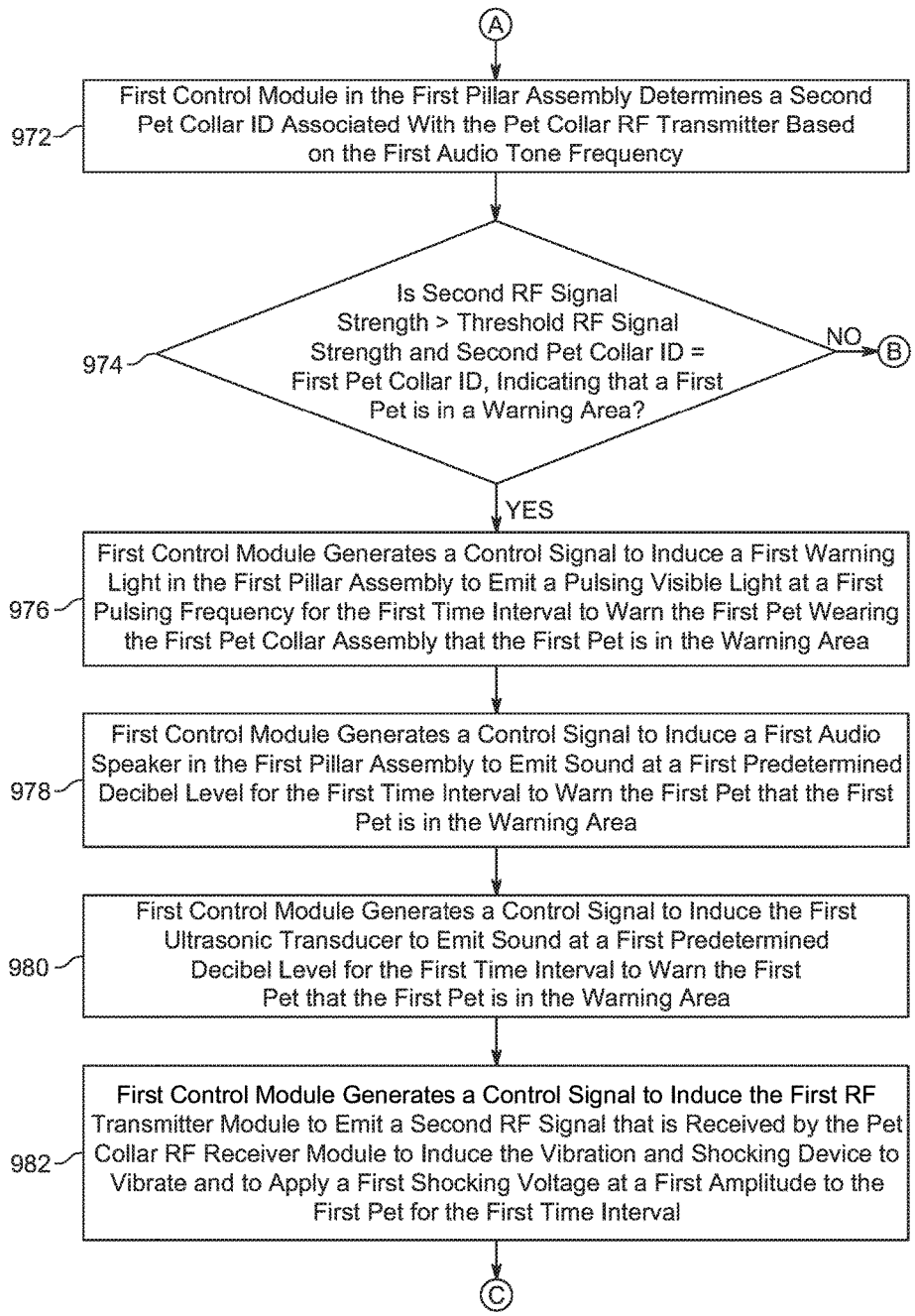
Figure 21:
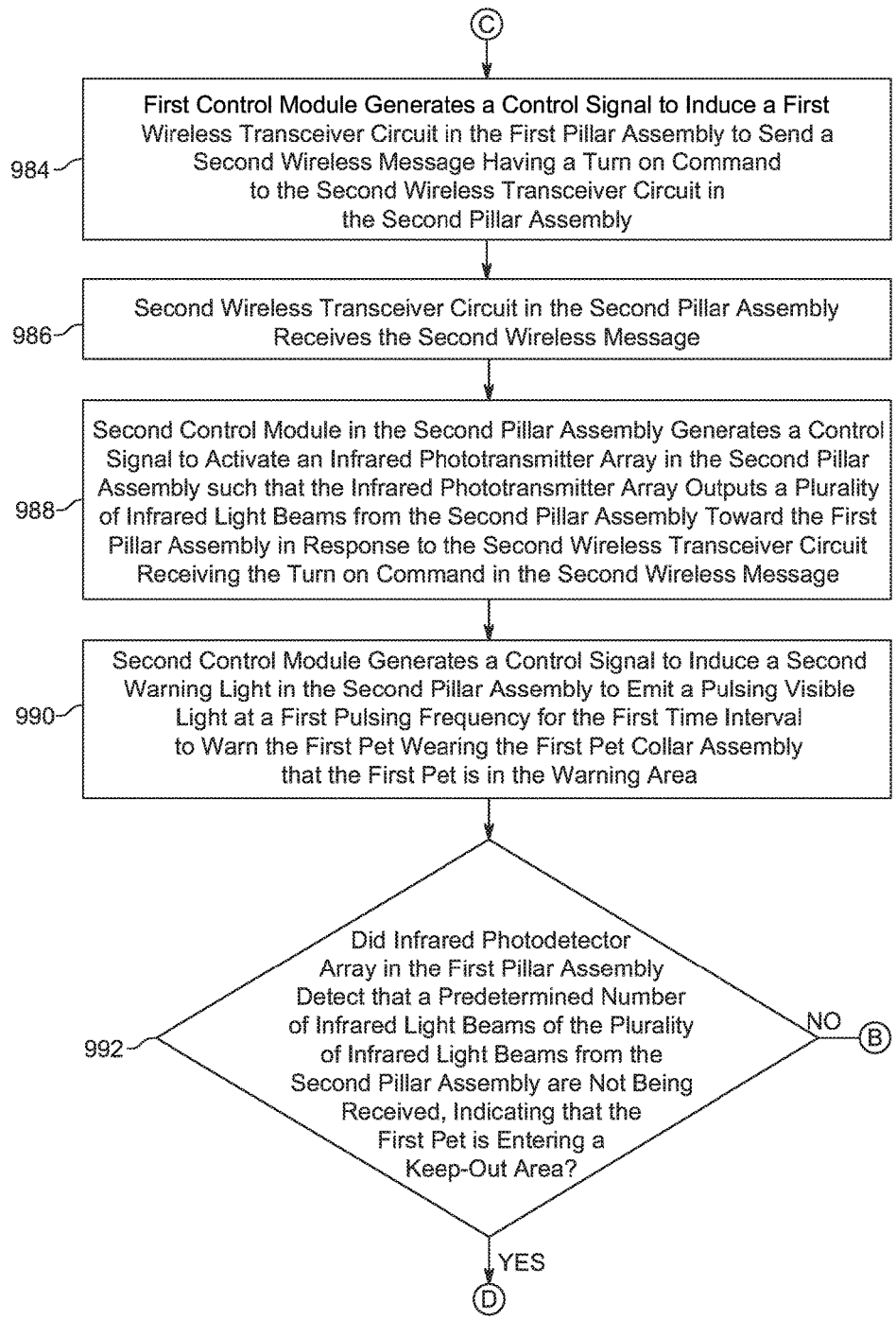
Figure 22:
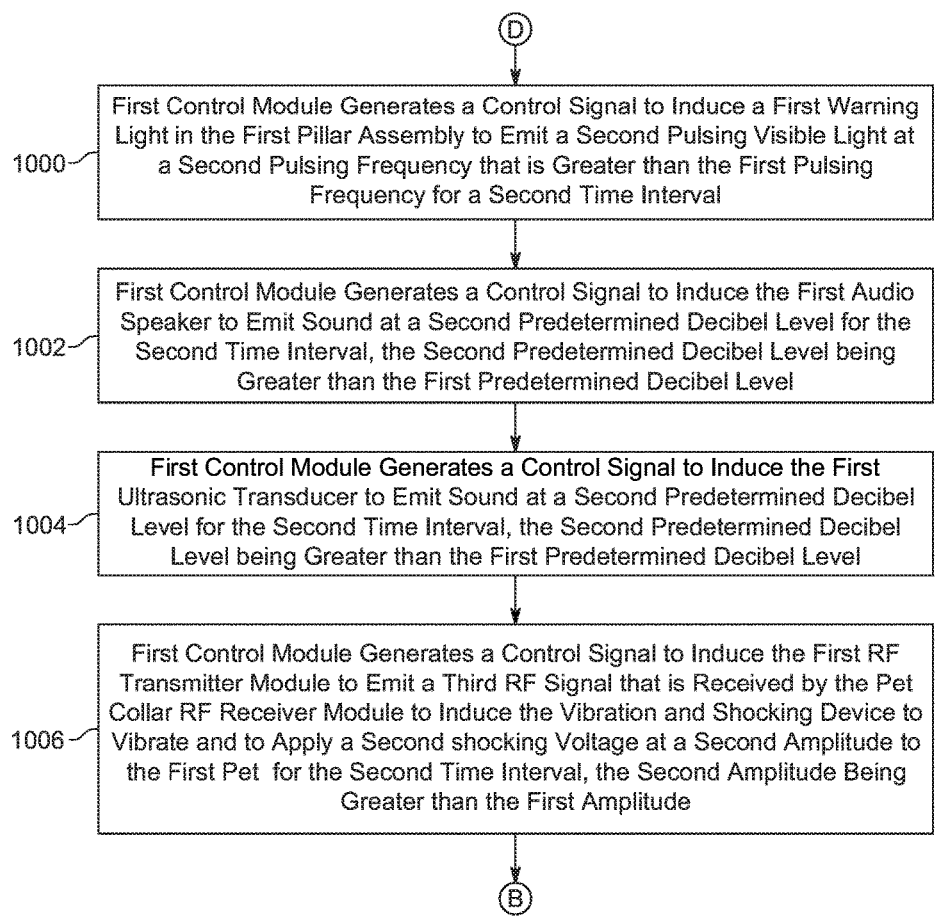

Referring to FIGS. 15 and 18, the pet collar assembly 612 is provided to be worn by a second pet. The pet collar assembly 612 includes a pet collar 668, a housing 670, a pet collar RF transmitter module 672, a pet collar RF receiver module 674, a vibration and shocking device 676, a pet collar control module 678, and a battery 679.

The pet collar 668 is sized to fit around a neck of the second pet. The housing 670 is attached to the pet collar 668 and holds the pet collar RF transmitter module 672, the pet collar RF receiver module 674, the vibration and shocking device 676, and the pet collar control module 678 therein.

The pet collar RF transmitter module 672 transmits an RF signal from an antenna 673 wherein the RF signal identifies the second pet collar assembly 612. In an exemplary embodiment, the RF signal is modulated utilizing a specific audio tone frequency (discussed above) which identifies the pet collar assembly 612. In an alternative embodiment, the RF signal is modulated to contain a specific digital ID which identifies the second pet collar assembly 612. The pet collar RF transmitter module 672 is operably coupled to the pet collar control module 678 and is controlled by the module 678.

The pet collar RF receiver module 674 receives RF signals at an antenna 675 from the right pillar assembly 614 that contain commands for controlling operation of the second pet collar assembly 612. In an exemplary embodiment, a first received RF signal has a first digital command code which instructs the pet collar control module 678 to command the vibration shocking device 676 to vibrate, and to shock the second pet at a first intensity level for a first predetermined time interval. Further, a second received RF signal has a second digital command code which instructs the pet collar control module 678 to command the vibration shocking device 676 to vibrate, and to shock the second pet at a second intensity level for a second predetermined time interval, wherein the second intensity level is greater than the first intensity level. The pet collar receiver module 674 is operably coupled to the pet collar control module 678 and sends received command codes to the module 678.

The vibration and shocking device 676 is provided to vibrate and to shock the second pet if commanded to do so. The vibration shocking device 676 is operably coupled to the pet collar control module 678 and is controlled by the module 678.

The accelerometer circuit 677 is provided to generate a movement signal when the pet wearing the second pet collar assembly 612 is moving, that is received by the pet collar control module 678. When the pet collar control module 678 does not receive the movement signal from the accelerometer circuit 677 for a predetermined time interval, the pet collar control module 678 enters a sleep-mode to conserve power from the battery 679. Thereafter, when the pet collar control module 678 receives the movement signal from the accelerometer circuit 677, the pet collar control module 678 enters a wake-up mode and performs the operational steps discussed herein.

The pet collar control module 678 is provided to control operation of the second pet collar assembly 612. In an exemplary embodiment, the pet collar control module 678 includes a microcontroller and a memory device operably coupled to the microcontroller. The microcontroller executes software stored in the memory device to control the operation of the second pet collar assembly 612.

The battery 679 is electrically coupled to the pet collar RF transmitter module 672, the pet collar RF receiver module 674, the vibration and shocking device 676, the accelerometer circuit 677, and the pet collar control module 678 and provides electrical power thereto.

Referring to FIGS. 14-16, the first pillar assembly 614 is provided to wirelessly communicate with the first pet collar assembly 610, the second pet collar assembly 612, and the second pillar assembly 616. The first pillar assembly 614 includes a first pillar housing 710, a first RF transmitter module 711, a first RF receiver module 712, a first wireless transceiver circuit 714, an infrared photodetector array 716, a first warning light 730, a first audio speaker 732, a first ultrasonic transducer 734, a pet collar switch 736, a pet collar switch 738, a first control module 740, and a battery 741.

The first pillar housing 710 is provided to hold the remaining components of the first pillar assembly 614 therein. In an exemplary embodiment, the first pillar housing 710 is constructed of plastic and stands vertically along a vertical axis. The first pillar housing 710 can be disposed on a floor 606 (shown in FIG. 16) adjacent to a doorjamb 602 of a dwelling.

The first RF transmitter module 711 is provided to emit an RF signal from an antenna 715 that is received by a pet collar RF receiver to induce an associated vibration shocking device to vibrate and to apply a shocking voltage to a pet in response to a control signal from the first control module 740. In an exemplary embodiment, the RF signal includes a pet collar ID that specifies the pet collar assembly to be controlled. For example, when the first control module 740 determines that the first pet collar assembly 610 is to vibrate and to shock the first pet, the first control module 710 generates a control signal that induces the first RF transmitter module 711 to emit an RF signal having a first pet collar ID (associated with the first pet collar assembly 610) and a digital command that is transmitted to the first pet collar assembly 610—to induce the first pet collar assembly 610 to vibrate and to shock the first pet. Further, when the first control module 740 determines that the second pet collar assembly 612 is to vibrate and shock the second pet, the first control module 710 generates a control signal that induces the first RF transmitter module 711 to emit an RF signal having a second pet collar ID (associated with the second pet collar assembly 612) and a digital command that is transmitted to the second pet collar assembly 612—to induce the second pet collar assembly 612 to vibrate and to shock the second pet.

The first RF receiver module 712 is provided to detect an RF signal from the first pet collar assembly 610 utilizing an antenna 713, then demodulates the RF signal to obtain a demodulated audio tone signal, and then sends the demodulated signal to the first control module 740. The first control module 740 determines a first audio tone frequency of the demodulated audio tone signal and then determines a first pet collar ID associated with the audio tone frequency. The first RF receiver module 712 further detects an RF signal from the second pet collar assembly 612 utilizing the antenna 713, then demodulates the RF signal to obtain a demodulated audio tone signal, and then sends the demodulated signal to the first control module 740. The first control module 740 determines a second audio tone frequency of the demodulated audio tone signal and then determines a second pet collar ID associated with the second audio tone frequency. Further, the first RF receiver module 712 determines a first RF signal strength of the RF signal from the first pet collar assembly 610 and then outputs an RSSI signal indicating the first RF signal strength to the first control module 740. Further, the first RF receiver module 712 determines a second RF signal strength of the RF signal from the second pet collar assembly 612 and then outputs an RSSI signal indicating the second RF signal strength to the first control module 740.

The first wireless transceiver circuit 714 is provided to wirelessly communicate with the second pillar assembly 616. The first wireless transceiver circuit 714 is operably coupled to the first control module 740 which controls operation of the first wireless transceiver circuit 714. The first wireless transceiver circuit 714 sends a wireless signal to the second wireless transceiver circuit 814 in the second pillar assembly 616 to command that the second warning light 830 to commence flashing, in response to a control signal from the first control module 740. The first wireless transceiver circuit 714 also receives a wireless signal from the second wireless transceiver circuit 814 indicating either a first pet collar ID or a second pet collar ID, when the second wireless transceiver circuit 814 received an RF signal from either the first pet collar assembly 610 or the second pet collar assembly 612, respectively. The pet collar ID (e.g., first pet collar ID or second pet collar ID) is communicated from the first wireless transceiver circuit 714 to the first control module 740. In an exemplary embodiment, the first wireless transceiver circuit 714 is an infrared transceiver circuit. In an alternative embodiment, the first wireless transceiver circuit 714 is an RF transceiver circuit.

The infrared photodetector array 716 is provided to detect infrared light beams transmitted from the infrared phototransmitter array 816 of the second pillar assembly 616 to the first pillar assembly 614. The infrared photodetector array 716 operably communicates with the first control module 740. In particular, the infrared photodetector array 716 generates signals indicating a number of infrared light beams detected from the infrared phototransmitter array 816. When a predetermined number of the infrared light beams is not received by the infrared photodetector array 716, indicating that a pet is blocking at least a portion of the infrared light beams between the first and second pillar assemblies 614, 616, the first control module 740 determines that the pet is entering the keep out area 622 (shown in FIG. 16).

The first warning light 730 is coupled to the first pillar housing 710, and is electrically coupled to the first control module 740. The first warning light 730 emits visible light from the first pillar housing 710 in response to a control signal from the first control module 740. In particular, the first warning light 730 emits a pulsing visible light at a first pulsing frequency in response to a control signal from the first control module 740. Further, the first warning light 730 outputs a pulsing visible light at a second pulsing frequency (greater than the first pulsing frequency) in response to another control signal from the first control module 740.

The first audio speaker 732 is coupled to the first pillar housing 710, and is electrically coupled to the first control module 740. The first audio speaker 732 emits sound from the first pillar housing 710 in response to a control signal from the first control module 740. In particular, the first audio speaker 732 emits sound at a first decibel level in response to a control signal from the first control module 740. Further, the first audio speaker 732 emits sound at a second decibel level (greater than the first decibel level) in response to another control signal from the first control module 740.

The first ultrasonic transducer 734 is coupled to the first pillar housing 710, and is electrically coupled to the first control module 740. The first ultrasonic transducer 734 emits ultrasonic sound from the first pillar housing 710 in response to a control signal from the first control module 740. In particular, the first ultrasonic transducer 734 emits ultrasonic sound at a first decibel level in response to a control signal from the first control module 740. Further, the first ultrasonic transducer 734 emits ultrasonic sound at a second decibel level (greater than the first decibel level) in response to another control signal from the first control module 740. It is noted that the ultrasonic sound can be heard by pets but cannot be heard by humans.

The pet collar switch 736 is electrically coupled to the first control module 740. Further, the pet collar switch 736 is associated with the first pet collar assembly 610. When the user transitions the pet collar switch 738 to a closed operational state, the first control module 740 is instructed by the user to perform steps to keep the first pet outside of the keep-out area 622 (shown in FIG. 16). Alternately, when the user transitions the pet collar switch 738 to an open operational state, the first control module 740 is instructed by the user to not perform steps to keep the first pet outside of the keep-out area 622.

The pet collar switch 738 is electrically coupled to the first control module 740. Further, the pet collar switch 738 is associated with the second pet collar assembly 612. When the user transitions the pet collar switch 738 to a closed operational state, the first control module 740 is instructed by the user to perform steps to keep the second pet outside of the keep-out area 622 (shown in FIG. 16). Alternately, when the user transitions the pet collar switch 738 to an open operational state, the first control module 740 is instructed by the user to not perform steps to keep the second pet outside of the keep-out area 622.

The first control module 740 is provided to control operation of first pillar assembly 614. The first control module 740 is operably coupled to the first RF transmitter module 711, the first RF receiver module 712, the first wireless transceiver circuit 714, the infrared photodetector array 716, the first warning light 730, the first audible speaker 732, the first ultrasonic transducer 734, the pet collar switch 736, and the pet collar switch 738. In an exemplary embodiment, the first control module 740 includes a microcontroller and a memory device operably coupled to the microcontroller. The microcontroller executes software stored in the memory device to control the operation of the first pillar assembly 614. The operation of the first pillar assembly 614 will be described in greater detail in the flowcharts described below.

The battery 741 is electrically coupled to the first RF transmitter module 711, the first RF receiver module 712, the first wireless transceiver circuit 714, the infrared photodetector array 716, the first warning light 730, the first audio speaker 732, the first ultrasonic transducer 734, the pet collar switch 736, the pet collar switch 738, and the first control module 740 and provides electrical power thereto.

The second pillar assembly 616 is provided to wirelessly communicate with the first pet collar assembly 610, the second pet collar assembly 612, and the first pillar assembly 614. The second pillar assembly 616 includes a second pillar housing 810, a second RF receiver module 812, a second wireless transceiver circuit 814, an infrared phototransmitter array 816, a second warning light 830, a second control module 832, and a battery 833.

The second pillar housing 810 is provided to hold the remaining components of the second pillar assembly 616 therein. In an exemplary embodiment, the second pillar housing 810 is constructed of plastic and stands vertically along a vertical axis. The second pillar housing 810 can be disposed on a floor 606 (shown in FIG. 16) adjacent to a doorjamb 604 of a dwelling and across from the first pillar assembly 614.

The second RF receiver module 812 is provided to detect an RF signal utilizing an antenna 813 from the first pet collar assembly 610 then demodulates the RF signal to obtain a demodulated audio tone signal, and then sends the demodulated signal to the second control module 832. The second control module 832 determines a first audio tone frequency of the demodulated audio tone signal and then determines a first pet collar ID associated with the first audio tone frequency. The second RF receiver module 812 further detects an RF signal from the second pet collar assembly 612 utilizing the antenna 813, and then sends the demodulated signal to the second control module 832. The second control module 832 determines a second audio tone frequency of the demodulated audio tone signal and then determines a second pet collar ID associated with the second audio tone frequency. Further, the second RF receiver module 812 determines a first RF signal strength of the RF signal from the first pet collar assembly 610 and then outputs an RSSI signal indicating the first RF signal strength to the second control module 832. Further, the second RF receiver module 812 determines a second RF signal strength of the RF signal from the second pet collar assembly 612 and then outputs an RSSI signal indicating the second RF signal strength to the second control module 832.

The second wireless transceiver circuit 814 is provided to wirelessly communicate with the first pillar assembly 614. The second wireless transceiver circuit 814 is operably coupled to the second control module 832 which controls operation of the second wireless transceiver circuit 814. The second wireless transceiver circuit 814 sends a wireless signal to the first wireless transceiver circuit 714 in the first pillar assembly 614 that has a pet collar ID (e.g., either a first pet collar ID associated the first pet collar assembly 610 or a second pet collar ID associated with the second pet collar assembly 612) if an RF signal strength of a received RF signal by the second RF receiver module 812 is greater than a threshold RF signal strength. For example, when the second control module 832 determines that an RF signal received by the second RF receiver module 812 is associated with the first pet collar assembly 610 (from either a modulated audio tone or a pet collar ID in the RF signal) and that the RF signal strength is greater than a threshold RF signal strength, the second control module 832 commands the second wireless transceiver circuit 814 to send a wireless signal to the first wireless transceiver circuit 714 having a first pet collar ID associated with the first pet collar assembly 610—indicating that the first pet is relatively close to the second pillar assembly 616. Further, when the second control module 832 determines that an RF signal received by the second RF receiver module 812 is associated with the second pet collar assembly 612 (from either a modulated audio tone or a pet collar ID in the RF signal) and that the RF signal strength is greater than a threshold RF signal strength, the second control module 832 commands the second wireless transceiver circuit 814 to send a wireless signal to the first wireless transceiver circuit 714 having a second pet collar ID associated with the second pet collar assembly 612—indicating that the second pet is relatively close to the second pillar assembly 616. In an exemplary embodiment, the second wireless transceiver circuit 814 is an infrared transceiver circuit. In an alternative embodiment, the second wireless transceiver circuit 814 is an RF transceiver circuit.

The infrared phototransmitter array 816 is provided to transmit infrared light beams from the second pillar assembly 616 across a portal in the doorway to the infrared photodetector array 716 in the first pillar assembly 614, in response to a control signal from the second control module 832. Further, the infrared phototransmitter array 816 stops transmitting infrared light beams in response to another control signal from the second control module 832. During operation, the infrared phototransmitter array 816 is pointed at the infrared photodetector array 716 such that the infrared photodetector array 716 can detect the infrared light beams transmitted from the infrared phototransmitter array 816.

The second warning light 830 is coupled to the second pillar housing 810, and is electrically coupled to the second control module 832. The second warning light 830 emits a visible light from the second pillar housing 810 in response to a control signal from the second control module 832. In particular, the second warning light 830 outputs a pulsing visible light at a first pulsing frequency in response to a control signal from the second control module 832. Further, the second warning light 830 outputs a pulsing visible light at a second pulsing frequency (greater than the first pulsing frequency) in response to another control signal from the second control module 832.

The second control module 832 is provided to control operation of second pillar assembly 616. The second control module 832 is operably coupled to the second RF receiver module 812, the second wireless transceiver circuit 814, the infrared phototransmitter array 816, and the second warning light. In an exemplary embodiment, the second control module 832 includes a microcontroller and a memory device operably coupled to the microcontroller. The microcontroller executes software stored in the memory device to control the operation of the second pillar assembly 616. The operation of the second pillar assembly 616 will be described in greater detail in the flowcharts described below.

The battery 833 is electrically coupled to the second RF receiver module 812, the second wireless transceiver circuit 814, the infrared phototransmitter array 816, the second warning light 830, and the second control module 832 and provides electrical power thereto.

Referring to FIGS. 1 and 19-22, a flowchart of a method for monitoring a location of the pet collar assembly 610 and operating the first and second pillar assemblies 614, 616 and the pet collar assembly 610 in the pet location monitoring and deterrent system 600 will be explained. It is noted that the method will be explained utilizing only the first pet collar assembly 610. However, it should be understood that the method could also be additionally utilized with the second petal collar assembly 612.

At step 950, the pet collar RF transmitter module 632 of a first pet collar assembly 610 transmits a first RF signal that is modulated with a first audio tone frequency associated with the first pet collar assembly 610. After step 950, the method advances to step 952.

At step 952, the second RF receiver module 812 in a second pillar assembly 616 receives the first RF signal from the pet collar RF transmitter module 632, and in response the second RF receiver module 812 outputs a first RSSI signal indicating a first RF signal strength of the first RF signal to the second control module 832, and outputs a demodulated audio tone signal having the first audio tone frequency to the second control module 832. After step 952, the method advances to step 956.

At step 956, the second control module 832 determines a first pet collar ID associated with the pet collar RF transmitter module 632 based on the first audio tone frequency. After step 956, the method advances to step 958.

At step 958, the second control module 832 makes a determination as to whether the first RF signal strength is greater than a threshold RF signal strength. If the value of step 958 equals "yes", the method advances to step 960. Otherwise, the method returns to step 952.

At step 960, the second control module 832 generates a control signal to induce a second wireless transceiver circuit 814 in the second pillar assembly 616 to transmit a first wireless message having the first pet collar ID to a first wireless transceiver circuit 714 in a first pillar assembly 614. After step 960, the method advances to step 962.

At step 962, the first wireless transceiver circuit 714 in the first pillar assembly 614 receives the first wireless message having the first pet collar ID. After step 962, the method advances to step 964.

At step 964, the first RF receiver module 712 in a first pillar assembly 614 receives the first RF signal from the pet collar RF transmitter module 632, and outputs a second RSSI signal indicating a second RF signal strength of the first RF signal to the first control module 740, and outputs a second demodulated audio tone signal having the first audio tone frequency to the first control module 740. After step 964, the method advances to step 972.

At step 972, the first control module 740 in the first pillar assembly 614 determines a second pet collar ID associated with the pet collar RF transmitter based on the first audio tone frequency. After step 972, the method advances to step 974.

At step 974, the first control module 740 makes a determination as to whether the second RF signal strength is greater than the threshold RF signal strength and whether the second pet collar ID is equal to the first pet collar ID, indicating that a first pet is in a warning area 620. After step 974, method advances to step 976.

At step 976, the first control module 740 generates a control signal to induce a first warning light 730 in the first pillar assembly 614 to emit a pulsing visible light at a first pulsing frequency for the first time interval to warn the first pet wearing the first pet collar assembly 610 that the first pet is in the warning area 620. After step 976, the method advances to step 978.

At step 978, the first control module 740 generates a control signal to induce a first audio speaker 732 in the first pillar assembly 614 to emit sound at a first predetermined decibel level for the first time interval to warn the first pet that the first pet is in the warning area 620. After step 978, the method advances to step 980.

At step 980, the first control module 740 generates a control signal to induce the first ultrasonic transducer 734 to emit sound at a first predetermined decibel level to warn the first pet that the first pet is in the warning area 620. After step 980, the method advances to step 982.

At step 982, the first control module 740 generates a control signal to induce the first RF transmitter module 711 to emit a second RF signal that is received by the pet collar RF receiver module 634 to induce the vibration and shocking device 636 to vibrate and to apply a first shocking voltage at a first amplitude to the first pet for the first time interval. After step 982, the method advances to step 984.

At step 984, the first control module 740 generates a control signal to induce a first wireless transceiver circuit 714 in the first pillar assembly 614 to send a second wireless message having a turn on command to the second wireless transceiver circuit 814 in the second pillar assembly 616. After step 984, the method advances to step 986.

At step 986, the second wireless transceiver circuit 814 in the second pillar assembly 616 receives the second wireless message. After step 986, the method advances to step 988.

At step 988, the second control module 832 in the second pillar assembly 616 generates a control signal to activate an infrared phototransmitter array 816 in the second pillar assembly 616 such that the infrared phototransmitter array 816 outputs a plurality of infrared light beams from the second pillar assembly 616 toward the first pillar assembly 614 in response to the second wireless transceiver circuit 814 receiving the turn on command in the second wireless message. After step 988, the method advances to step 990.

At step 990, the second control module 832 generates a control signal to induce a second warning light 830 in the second pillar assembly 616 to emit a pulsing visible light at a first pulsing frequency for the first time interval to warn the first pet wearing the first pet collar assembly 610 that the first pet is in the warning area 620. After step 990, the method advances to step 992.

At step 992, the first control module 740 makes a determination as to whether the infrared photodetector array 716 in the first pillar assembly 614 detects that a predetermined number of infrared light beams of the plurality of infrared light beams from the second pillar assembly 616 are not being received, indicating that the first pet is entering a keep-out area 622. If the value of step 992 equals "yes", the method advances to step 1000. Otherwise, the method returns the step 952.

At step 1000, the first control module 740 generates a control signal to induce a first warning light 730 in the first pillar assembly 614 to emit a second pulsing visible light at a second pulsing frequency that is greater than the first pulsing frequency for a second time interval. After step 1000, the method advances to step 1002.

At step 1002, the first control module 740 generates a control signal to induce the first audio speaker 732 to emit sound at a second predetermined decibel level for the second time interval. The second predetermined decibel level is greater than the first predetermined decibel level. After step 1002, the method advances to step 1004.

At step 1004, the first control module 740 generates a control signal to induce the first ultrasonic transducer 734 to emit sound at a second predetermined decibel level for the second time interval. The second predetermined decibel level is greater than the first predetermined decibel level. After step 1004, the method advances to step 1006.

At step 1006, the first control module 740 generates a control signal to induce the first RF transmitter module 711 to emit a third RF signal that is received by the pet collar RF receiver module 634 to induce the vibration and shocking device 636 to vibrate and to apply a second shocking voltage at a second amplitude to the first pet for the second time interval. The second amplitude is greater than the first amplitude. After step 1006, the method returns to step 952.

The pet location monitoring and deterrent systems described herein provide a substantial advantage over other systems. In particular, the inventive systems prevent a pet from entering a keep-out area behind first and second pillar assemblies. When the pet is detected in a warning area, the first and second pillar assemblies alert the pet via emitted light, emitted sound, and emitted ultrasonic sound that the pet has entered a warning area. If the pet continues moving forward toward the first and second pillar assemblies and blocks infrared light beams transmitted between the first and second pillar assemblies, the pet is further warned via emitted light, emitted sound, and emitted ultrasonic sound. Further, the first pillar assembly may transmit a wireless message to a pet collar assembly worn by the pet to command that the pet collar assembly to vibrate and to shock the pet.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A pet location monitoring and deterrent system, comprising:
   a first pet collar assembly having a first pet collar radio frequency (RF) transmitter module that transmits a first RF signal;
   a first pillar assembly having a first control module, a first RF receiver module, a first wireless transceiver circuit, an infrared photodetector array, and a first warning light; the first control module being operably coupled to the first RF receiver module, the infrared photodetector array, the first wireless transceiver circuit, and the first warning light;
   a second pillar assembly having a second control module, a second RF receiver module, an infrared phototransmitter array, and a second wireless transceiver circuit; the second control module being operably coupled to the second RF receiver module, the infrared phototransmitter array, and the second wireless transceiver circuit;
   the first pillar assembly and the second pillar assembly being disposed a predetermined distance apart from one another such that a warning area is defined in front of and proximate to the first pillar assembly and the second pillar assembly, and a keep-out area is defined behind and proximate to the first pillar assembly and the second pillar assembly;
   the second RF receiver module receiving the first RF signal;
   the second control module determining whether a first RF signal strength of the first RF signal is greater than a threshold RF signal strength;
   the second control module further determining a first pet collar identification (ID) associated with the first pet collar assembly based on the first RF signal;
   the second control module generating a first control signal to induce the second wireless transceiver circuit to transmit a first wireless message having the first pet collar ID to the first wireless transceiver circuit in the first pillar assembly if the first RF signal strength is greater than the threshold RF signal strength;
   the first wireless transceiver circuit receiving the first wireless message;
   the first RF receiver module receiving the first RF signal;
   the first control module determining whether a second RF signal strength of the first RF signal is greater than the threshold RF signal strength;
   the first control module further determining a second pet collar ID associated with the first pet collar assembly based on the first RF signal; and
   the first control module further generating a second control signal to induce the first warning light to emit a first pulsing visible light at a first pulsing frequency, in response to the second RF signal strength being greater than the threshold RF signal strength, and the first pet collar ID being equal to the second pet collar ID.

2. The pet location monitoring and deterrent system of claim 1, wherein
   the first control module further generating a third control signal to induce the first wireless transceiver circuit to send a second wireless message having a turn on command to the second wireless transceiver circuit in the second pillar assembly;
   the second wireless transceiver circuit receiving the second wireless message; and
   the second control module further generating a fourth control signal to activate the infrared phototransmitter array such that the infrared phototransmitter array outputs a plurality of infrared light beams from the second pillar assembly toward the first pillar assembly in response to the second wireless transceiver circuit receiving the turn on command in the second wireless message.

3. The pet location monitoring and deterrent system of claim 2, wherein the first control module further generating a fifth control signal to induce the first warning light to emit a second pulsing visible light at a second pulsing frequency that is greater than the first pulsing frequency, if the infrared photodetector array detects that a predetermined number of infrared light beams of the plurality of infrared light beams from the second pillar assembly is not being received indicating that a first pet is entering the keep-out area.

4. The pet location monitoring and deterrent system of claim 2, wherein the first pillar assembly further includes a first audio speaker operably coupled to the first control module, the first control module generating a fifth control signal to induce the first audio speaker to emit sound at a first predetermined decibel level to warn a first pet that the first pet is in the warning area, in response to the second RF signal strength being greater than the threshold RF signal strength, and the first pet collar ID being equal to the second pet collar ID.

5. The pet location monitoring and deterrent system of claim 4, wherein first control module further generating a sixth control signal to induce the first audio speaker to emit sound at a second predetermined decibel level, if the infrared photodetector array detects that a predetermined number of infrared light beams of the plurality of infrared light beams from the second pillar assembly is not being received indicating that the first pet is entering the keep-out area; the second predetermined decibel level being greater than the first predetermined decibel level.

6. The pet location monitoring and deterrent system of claim 2, wherein the first pillar assembly further includes a first ultrasonic transducer operably coupled to the first control module, the first control module generating a fifth control signal to induce the first ultrasonic transducer to emit sound at a first predetermined decibel level to warn a first pet that the first pet is in the warning area, in response to the second RF signal strength being greater than the threshold RF signal strength, and the first pet collar ID being equal to the second pet collar ID.

7. The pet location monitoring and deterrent system of claim 6, wherein the first control module further generating a sixth control signal to induce the first ultrasonic transducer to emit sound at a second predetermined decibel level, if the infrared photodetector array detects that a predetermined number of infrared light beams of the plurality of infrared light beams from the second pillar assembly is not being received indicating that the first pet is entering the keep-out area; the second predetermined decibel level being greater than the first predetermined decibel level.

8. The pet location monitoring and deterrent system of claim 2, wherein the first pet collar assembly further includes a pet collar RF receiver module and a vibration and shocking device, the first pillar assembly further having a first RF transmitter module operably coupled to the first control module, the first control module further generating a fifth control signal to induce the first RF transmitter module to emit a second RF signal that is received by the pet collar RF receiver to induce the vibration and shocking device to vibrate and to apply a first shocking voltage at a first amplitude, in response to the second RF signal strength being greater than the threshold RF signal strength, and the first pet collar ID being equal to the second pet collar ID.

9. The pet location monitoring and deterrent system of claim 8, wherein the first shocking voltage is applied to a first pet for a first predetermined time interval.

10. The pet location monitoring and deterrent system of claim 9, wherein the first control module further generating a sixth control signal to induce the first RF transmitter module to emit a third RF signal that is received by the pet collar RF receiver to induce the vibration and shocking device to vibrate and to apply a second shocking voltage at a second amplitude greater than the first amplitude, if the infrared photodetector array detects that a predetermined number of infrared light beams of the plurality of infrared light beams from the second pillar assembly is not being received indicating that a first pet is entering the keep-out area.

11. The pet location monitoring and deterrent system of claim 10, wherein the second shocking voltage is applied to the first pet for a second predetermined time interval greater than the first predetermined time interval.

12. The pet location monitoring and deterrent system of claim 1, wherein
the first control module further generating a third control signal to induce the first wireless transceiver circuit to send a second wireless message having a turn on command to the second wireless transceiver circuit in the second pillar assembly;
the second wireless transceiver circuit receiving the second wireless message; and
the second pillar assembly further includes a second warning light operably coupled to the second control module, the second control module further generating a fourth control signal to induce the second warning light to emit a second pulsing visible light at the first pulsing frequency to warn a first pet that the first pet is in the warning area, in response to the second wireless transceiver circuit receiving the second wireless message.

13. The pet location monitoring and deterrent system of claim 1, wherein the first RF signal is modulated with a first audio tone frequency, the first control module of the first pillar assembly generating the second pet collar ID based on the first audio tone frequency.

14. The pet location monitoring and deterrent system of claim 13, further comprising a first pet collar switch operably coupled to the first control module, the first control module determining if the first pet collar switch associated with the first pet collar assembly has a first operational state indicating that a first pet having the first pet collar assembly is to be kept outside of the keep-out area.

15. The pet location monitoring and deterrent system of claim 14, further comprising a second pet collar assembly having a second pet collar RF transmitter module, the second pet collar RF transmitter module transmitting a second RF signal modulated with a second audio tone frequency.

16. The pet location monitoring and deterrent system of claim 15, further comprising a second pet collar switch operably coupled to the first control module, the first control module determining if the second pet collar switch associated with the second pet collar assembly has the first operational state indicating that a second pet having the second pet collar assembly is to be kept outside of the keep-out area.

17. The pet location monitoring and deterrent system of claim 1, wherein the first pet collar assembly further includes a pet collar control module and an accelerometer circuit, the pet collar control module being operably coupled to the accelerometer circuit and to the first pet collar RF transmitter module, the accelerometer circuit only generating a movement signal when the first pet collar assembly is being moved, the pet collar control module entering a sleep-mode when the pet collar control module does not receive the movement signal for a predetermined time interval.

18. The pet location monitoring and deterrent system of claim 1, wherein the second RF receiver module outputting a first received signal strength indicator (RSSI) signal indicating the first RF signal strength of the first RF signal, the first RSSI signal being received by the second control module.

19. The pet location monitoring and deterrent system of claim 18, wherein the first RF receiver module outputting a second RSSI signal indicating the second RF signal strength of the first RF signal, the second RSSI signal being received by the first control module.

* * * * *